United States Patent [19]

Hähnke et al.

[11] Patent Number: 4,607,071

[45] Date of Patent: Aug. 19, 1986

[54] PROCESS FOR SPIN-DYEING OF ACID-MODIFIED POLYMERS OF COPOLYMERS OF ACRYLONITRILE USING RAPID-FIXING DI-QUATERNARY CATIONIC DYES

[75] Inventors: Manfred Hähnke, Kelkheim; Reinhard Mohr, Offenbach am Main; Kurt Hohmann, Neu-Isenburg, all of Fed. Rep. of Germany

[73] Assignee: Hoechst Aktiengesellschaft, Fed. Rep. of Germany

[21] Appl. No.: 734,442

[22] Filed: May 15, 1985

Related U.S. Application Data

[63] Continuation of Ser. No. 538,800, Oct. 4, 1983, Pat. No. 4,557,732, which is a continuation-in-part of Ser. No. 420,516, Sep. 20, 1982, abandoned, which is a continuation of Ser. No. 225,851, Jan. 16, 1981, abandoned, which is a continuation of Ser. No. 40,760, May 21, 1979, abandoned.

[51] Int. Cl.$^4$ ............... C08K 5/22; C08J 3/20; D01F 6/18
[52] U.S. Cl. ............... 524/189; 8/538; 8/539; 8/654; 8/655; 8/927; 524/86; 524/87; 524/94; 524/252; 524/255
[58] Field of Search ............... 524/110, 189, 252, 255, 524/86, 87, 94; 8/539, 654, 655, 538

[56] References Cited

U.S. PATENT DOCUMENTS

| | | | |
|---|---|---|---|
| 2,863,875 | 12/1958 | Biemert et al. | 8/654 |
| 3,148,935 | 9/1964 | Pfitzner et al. | 8/657 |
| 3,232,904 | 2/1966 | Seibert et al. | 8/927 |
| 3,271,383 | 9/1966 | Yamaya et al. | 8/655 |
| 3,597,151 | 8/1971 | Baumann et al. | 8/657 |
| 3,642,823 | 2/1972 | Raue et al. | 8/637 |
| 3,647,349 | 3/1972 | Raue et al. | 8/510 |
| 3,996,192 | 12/1976 | Hahnke et al. | 524/110 |

*Primary Examiner*—A. Lionel Clingman
*Attorney, Agent, or Firm*—Connolly and Hutz

[57] ABSTRACT

Improvement of a process for spin-dyeing acid-modified polymers or copolymers of acrylonitrile in which cationic quaternary dyestuffs are added to the spinning mass and spun according to the wet-spinning procedure. The improvement is characterized by using dyestuffs characterized by a migration factor M of 20 or less than 20, by a combination index K of less than 2.5 and a cation weight of more than 310. Migration factor M and combination index K are known values in the dyestuff field or can be determined. The dyestuff to be used according to the invention can belong to the most different classes of dyestuffs; they fix rapidly on the polymer, and thus they do not color, or color only to a minor extent, the coagulation, stretching and washing baths although they are soluble in water and aqueous solutions of these baths. The fibers and filaments obtained by the process of the invention have outstanding fastnesses to wet processing and, owing to the absence of dyestuff aggregates at the surface of the fiber such as occur when spin-dyeing with pigments, very good fastnesses to dry and wet rubbing. The fibers are intense, absolutely transparent and free from specks.

16 Claims, No Drawings

PROCESS FOR SPIN-DYEING OF ACID-MODIFIED POLYMERS OF COPOLYMERS OF ACRYLONITRILE USING RAPID-FIXING DI-QUATERNARY CATIONIC DYES

This application is a continuation of Ser. No. 538,800, filed Oct. 4, 1983, now U.S. Pat. No. 4,557,732, which is a continuation-in-part application of U.S. patent application Ser. No. 420,516 filed Sept. 20, 1982, abandoned, which is a continuation application of U.S. patent application Ser. No. 225,851 filed Jan. 16, 1981, abandoned, which again was a continuation application of the U.S. patent application Ser. No. 40,760 filed May 21, 1979, abandoned.

It is known to spin-dye polymers or copolymers of acrylonitrile with organic or inorganic colored pigments and to spin the spinning composition dyed in this way by the dry spinning or wet spinning process. However, the manufacture of the colored pigments used for this purpose requires a high outlay in respect of their finish in order to produce the necessary particle structure and particle fineness. In this connection it is not always possible to achieve a uniform and reproducible particle size distribution. When pigments are used in the spinning composition, however, inadequate particle size and particle size distribution lead to serious disadvantages; thus it is not possible to avoid continuous mechanical wear of the spinnerets and even clogging of the latter, which can lead to inaccuracies of denier or to the loss of individual spin filaments. In addition, depending on the fineness of their particles, colored pigments also cause more or less pronounced inhomogeneities within the spun filaments, which result in delustering effects, unfavorable influences on handle and impairment of the mechanical properties of the filaments, for example the tear strength. These disadvantages apply to both the dry spinning process and the wet spinning process.

It is also known to spin-dry polymers and copolymers of acrylonitrile by using dyestuffs which are soluble in the spinning solutions. Examples of such dyestuffs are complex compounds of basic dyestuffs with heteropoly acids, water-insoluble or sparingly soluble salts of aromatic sulfonic acids with basic dyestuffs or free non-quaternary dyestuff bases or salts thereof.

Complex compounds of basic dyestuffs with heteropolyacids are known, for example from French Patent Specification No. 1,068,382. However, these dyestuffs have the disadvantage that they only produce low depths of color, owing to the fact that they contain a very high proportion, in terms of weight, of the anion, which makes no chromophoric contribution, the ratio of dyestuff cation weight to anion weight being about 1 or less than 1. Sulfonates of basic dyestuffs, which are manufactured by precipitating the basic dyestuffs from their aqueous solutions by means of aromatic sulfonic acids, are known, for example from German Patent Specification No. 1,077,372. In the known wet spinning processes, in which spinning is carried out from, for example, solutions of dimethylformamide, dimethylacetamide, dimethyl sulfoxide or ethylene carbonate or from aqueous thiocyanate solution, these dyestuffs lead to considerable bleeding in the aqueous coagulation, stretching and washing baths, and in dry spin-dyeing lead to bleeding in the aqueous stretching and washing baths, since the dye-stuffs are not adequately fixed in the polymer. Here too, the ratio of dyestuff cation weight to anion weight is so low that is not possible to achieve very deeply colored dyeings. Free, non-quaternary dyestuff bases and salts thereof are known, for example from German Patent Specification No. 2,359,466 and German Auslegeschrift No. 2,411,328 or German Auslegeschrift No. 2,413,299. These dyestuffs are sparingly soluble or insoluble in water and therefore hardly bleed or do not bleed at all when the dyed spinning compositions are spun into water; in the dry spinning process there is likewise no staining of the downstream aqueous stretching and washing baths. However, the known spinning processes operated on a large industrial scale use a counter-current process, the aqueous medium passing through the different baths in the opposite direction to the spun filaments. The result of this is that, for example when using dimethylformamide as the solvent in the spinning composition, the coagulation bath of the wet spinning procedure contains about 30 to 70% by weight, the stretching bath contains about 15 to 70% by weight and the washing bath contains up to about 30% by weight, of dimethylformamide. However, since these dyestuffs or dyestuff salts are not adequately fixed in the polymer material, but are readily soluble in these baths, they also undergo considerable bleeding if these coagulation, stretching and washing baths are used, which also contain, as well as water, the fairly large quantities mentioned of the solvent used in the spinning composition.

Processes for spin-dyeing polymers and copolymers of acrylonitrile with dope-soluble dyestuffs, are also described in other publications, for example in German Patent Specification Nos. 1,044,022 and in the U.S. Pat. Nos. 3,148,935, 3,232,904, 3,673,182, 3,996,192, 4,020,037, 4,039,539, 4,100,131 and 3,770,727 as well as in the British Patent Specification No. 1,514,263. These dyestuffs are mainly compounds which also bleed considerably into the coagulation, stretching and washing baths in the wet spinning process.

The bleeding of the dyestuffs into these baths is, of course, not desirable and this advantage should, at least, be kept to the minimum proportions possible, since it has very adverse consequences in a variety of ways. Thus, for example, the quantity of dyestuff which has bled out is lost for spin-dyeing and paler color shades are produced than if non-bleeding dyestuffs with the same basic tinctorial strength are used. If mixtures of bleeding and non-bleeding dyetuffs are used at the same time in the spinning composition, the shade of the dyed filament is changed depending on the extent of the bleeding, so that a loss of color which varies with time and the degree of saturation of the baths in respect of the dyestuffs, can occur in the case of the dyed filaments. Furthermore, the coagulation, stretching and washing baths must be continuously regenerated in order to ensure constant spinning conditions; in addition, these baths must be worked up in respect of the solvents contained in them, and, in working up by distillation, the dyestuff which has bled out accumulates in the distillation sump, where it can undergo decomposition at the high temperatures which are required. The decomposition products can, however, cause contamination of the regenerated material and, if the latter is re-used, can have a harmful effect on the spinning process and the materials being spun. But even if the baths are regenerated by adsorption, for example through a bed composed of an acrylonitrile polymer or copolymer, with baths containing a great deal of dyestuff there is a rapid exhaustion of the capacity of the adsorbent.

In the present invention an improved process for spin-dyeing an acid-modified polymer or copolymer of acrylonitrile according to the wet-spinning procedure with the use of a quaternary dyestuff has now been found which does not suffer from these disadvantages or suffers from them only to a very small extent. This is because it has been found, in the present invention, that acid-modified polymers and copolymers of acrylonitriles can be advantageously spun-dyed according to the wet-spinning procedure if the dyestuffs used are cationic dyestuffs containing two or three quaternary groups defined below, which means bis- or tris-quaternary dyestuffs, which have the property of becoming strongly and rapidly fixed on the polymer. These dyestuffs which do not stain the coagulation, stretching and washing baths, or only do so to an imperceptible extent, although they are soluble in water and aqueous solutions used in the coagulation, stretching and washing baths.

The process according to the invention is characterized in that the quaternary dyestuff used contains two or three quaternary ammonium or cyclammonium groups in the cation and has a migration factor M of 20 or less than 20, a combination index K of less than 2.5 and a cation weight (CW) of more than 310, preferably more than 380 and, in particular, more than 480.

These dyestuffs used in accordance with the invention, are employed in an amount of up to about 7% by weight dependent on the color-depth desired, and preferably in a quantity of 0.01 to 5% by weight, especially 0.1 to 3% by weight, relative to the polymer to be dyed.

The migration factor M indicates the migration behaviour and the affinity of a dyestuff on or for the fiber; in accordance with the following definition and determination it can have values between zero and 100. For the process according to the invention, a low value denotes a strong fixing and a high value denotes a weak fixing of the dyestuff in the polymer. It is determined as follows: a polyacrylonitrile fiber material (yarn) is first dyed in a 1/1 standard depth by the exhaustion process from an aqueous bath at a liquor ratio of 1:30; relative to the weight of the fiber employed, the bath contains 0.3% of dyestuff, 1% of 60% strength by weight acetic acid, 2% of sodium acetate (crystalline), 10% of anhydrous sodium sulfate and 0.3% of a product from the reaction of about 2.5 moles of ethylene oxide with 1 mole of stearylamine as a migration auxiliary. The fiber material is agitated in this dyebath for 60 minutes at 98°–100° C.; the dyeing thus obtained has a depth of color F=100%. Part of this dyed fiber material is then treated, together with an equal part of an undyed (original) polyacrylonitrile fiber material, under the same conditions as indicated above, but in an aqueous bath containing no dyestuff, whereupon, depending on its migration behaviour, the dyestuff is more or less strongly absorbed from the already dyed fiber material, having F=100%, onto the undyed accompanying fiber material. After the migration test, the original dyeing now has a lower depth of color which is designated $F_M$ here, and the stained accompanying fabric now has a depth of color $F_W$. The migration factor M is determined from these two values by means of the following equation:

$$M = \frac{F_W}{F_M} \cdot 100$$

The nature and the significance of the combination index K, and also its determination, are described in the journal "J. Soc. Dyers Col.", volume 88 (1972), pages 220–222. For the process according to the invention, a low value of K denotes rapid fixing while a high value of K denotes slow fixing of the dyestuff in the polymer.

The process according to the invention proves particularly advantageous when using said quaternary dyestuffs which have a migration factor of 20 and less than 20, a combination index K of 2 and less than 2 and a cation weight of more than 310, in particular have the following combination of properties: a migration factor of 10 and less than 10, a combination index of less than 2 and a cation weight of more than 380, in particular more than 480. However, the decisive factor here is the selection of the indices M and K.

The process of the invention using said bis- and tris-quaternary dyestuffs is improved in comparison to known wet-spinning procedures in which a mono-quaternary dyestuff is used, such as described in the British Patent Specification Nos. 1,246,007, 1,139,408, 1,508,361 and 1,514,263 and in the U.S. Pat. Nos. 2,863,875, 3,148,935 and 3,232,904, because, in these known processes, the coagulation, stretching and washing baths are colored, or stronger colored, by these mono-quaternary dyes, bleeding out from the spun-dyed polyacrylonitrile fibre into the bath, than the bis- and tris-quaternary dyestuffs in the process of the invention. This improvement produced by the process of the invention is highly unexpected and surprising for the ground that a second and third quaternary group increases, as a cationic group and thus as a salt-forming group, the solubility of the dyestuffs in water. In view of this increased solubility in water, an increased bleeding out from the spun-dyed fibre into the aqueous baths had been expected, too.

The use of a bis-quaternary dyestuff in a spin-dyeing process of polyacrylonitrile is disclosed in U.S. Pat. No. 3,271,383, but the dry-spinning method is the only spin-dyeing method specifically disclosed. Prior to this invention, the dry-spinning method was preferred because it was well-known that water-soluble dyestuffs bleed strongly out or bleed much stronger out from the spun-dyed fibres into the baths if prepared according to the wet-spin-dyeing procedure than if prepared according to the dry-spin-dyeing procedure. As already explained earlier in the instant discussion of the prior art, those water-soluble dyestuffs had been used in a wet-spin-dyeing procedure, for that reason, in form of insoluble salts or complexes.

These quaternary groups in the dyestuffs used in accordance with the invention can be identical or different from one another. Examples of quaternary ammonium groups are trialkylammonium groups containing lower alkyl radicals, optionally substituted, N,N-dialkyl-N-aryl-ammonium groups containing optionally substituted lower alkyl radicals, N,N-dialkyl-N-aralkylammonium groups containing lower, optionally substituted alkyl groups, and N-mono-alkyl-N-aryl-N-aralkylammonium groups containing a lower, optionally substituted alkyl group; these ammonium groups are linked to the aromatic part of the chromophoric system, for example, to a benzene or naphthalene nucleus, either direct or via an aliphatic radical which may contain or may be bound with hetero-atoms and/or small organic gruups, such as oxy, amino, lower alkyl-amino, hydroxy, carbonyl, sulfonyl.

Quaternary groups in the dyestuffs used in accordance with the invention are, furthermore, lower dialkylhydrazonium groups and cyclammonium groups, preferably of an aromatic character, in particular mesomeric 5-membered or 6-membered quaternary rings, which can contain further hetero-atoms, such as oxygen, sulfur and/or nitrogen atoms.

The cyclammonium groups can be a constituent of the chromophoric system or can be directly linked to an aromatic carbocyclic radical, such as a benzene nucleus or naphthalene nucleus, or can be fused to the latter. Examples of cyclammonium radicals and derivatives thereof are pyridinium, pyrazolium, imidazolium, triazolium, tetrazolium, oxazolium, thiazolium, oxdiazolium, thiadiazolium, quinolinium, indazolium, benzimidazolium, benzisothiazolium, benzthiazolium, arylguanazolium or benzoxazolium radicals, and these radicals are substituted in the heterocyclic structures, preferably by lower, optionally substituted alkyl radicals, aralkyl, aryl and/or cycloalkyl radicals; they may be substituted in the aromatic carbocyclic parts by cationic groups, or by basic and/or non-ionic groups; examples of basic groups are primary, secondary or tertiary amino groups, hydrazino or amidino groups, and also heterocyclic nitrogen-containing rings, such as, for example, the pyridine, imidazole, morpholine, piperidine or piperazine ring, and examples of non-ionic groups are halogen atoms, such as chlorine or bromine atoms, lower, optionally substituted alkyl groups, lower alkoxy groups, the nitro group, the sulfamoyl or carbamoyl group, a sulfamoyl or carbamoyl group which is substituted by lower alkyl, phenyl and/or benzyl, a lower alkylsulfone group and a lower alkanoylamino group, the benzoylamino group, the trifluoromethyl group and the cyano group.

In the preceding text and in the following text, the terms used have the following meanings:

The term "lower" denotes that the alkyl or alkylene radical present in this group or in this radical consists of 1 to 4 C-atoms; the term "substituted alkyl radical" denotes that the alkyl is substituted by one or two, preferably one, substituent belonging to the group comprising hydroxy, acetoxy, lower alkoxy, cyano, lower carbalkoxy, such as carbomethoxy and carboethoxy, chlorine, phenyl and carbamoyl, it being also possible for the phenyl to be substituted by halogen, such as chlorine, bromine or fluorine, lower alkyl, lower alkoxy, nitro, acetylamino, sulfamoyl and/or carbamoyl, and for the carbamoyl also to be monosubstituted or disubstituted by lower alkyl, a phenyl group or a benzyl radical, the substituted alkyl radical being, for example, a β-hydroxyethyl, β-cyanoethyl, β-acetoxyethyl, γ-hydroxypropyl, β-methoxyethyl, benzyl or phenethyl group; the term "aryl" denotes an aryl radical, in particular a phenyl or naphthyl radical which can also be substituted by the basic, cationic or non-ionic groups indicated above; non-ionic substituents, 1 to 3 of which can preferably be present in the alkyl radical, are, in particular, halogen, such as chlorine or bromine, lower alkyl, such as methyl or ethyl, lower alkoxy, such as methoxy, ethoxy or propoxy, nitro, lower alkylsulfonyl and trifluoromethyl; the term "aralkyl" denotes a lower alkyl radical which is substituted by an aryl radical, the aryl radical having the abovementioned meaning; the aryl radical in the "aralkyl" is preferably a phenyl radical which can be substituted by 1 or 2 substituents belonging to the group comprising lower alkyl, lower alkoxy and chlorine; and the term "cycloalkyl" denotes a cycloalkyl radical having 4 to 12 C-atoms, such as the cyclopentyl or cyclohexyl radical, which can also be substituted by 1 to 3 lower alkyl groups, such as methyl groups.

Lower alkyl groups (alkyl radicals) are, in particular, the methyl and ethyl group, and lower alkoxy groups are, in particular, the methoxy and ethoxy group. Aralkyl radicals are, in particular, the benzyl and phenethyl group.

Quaternary ammonium groups which should preferably be mentioned are the trimethylammonium group, the triethylammonium group, the dimethylethylammonium group, the benzyldimethylammonium group and the phenyldimethylammonium group.

Lower, substituted alkyl radicals which are linked by the alkyl to a nitrogen atom are preferably alkyl groups having 1 to 4 C-atoms, which are substituted by a hydroxy, lower alkoxy, cyano or phenyl group, such as, for example, the β-hydroxyethyl, β-cyanoethyl, β-methoxyethyl group or the benzyl or phenethyl group.

The quaternary dyestuffs used in accordance with the invention preferably contain, as the anion $X^{(-)}$, the anion of a strong inorganic or organic acid, such as sulfuric acid or (lower alkyl)-half-esters thereof (=lower alkosulfate), hydrochloric acid, phosphoric acid, perchloric acid, tetrafluoboric acid, acetic acid, chloroacetic acid, trichloroacetic acid, formic acid, oxalic acid, lactic acid, propionic acid or malonic acid. The dyestuffs can also be present as chlorides in the form of their double salts with zinc chloride. The nature of the anion is of no importance for the tinctorial properties of the dyestuffs used in accordance with the invention, provided that it is a colorless anion and provided that the ratio of the cation weight to the anion weight is not less than 2.5:1; dyeings having a particularly good depth of color are achieved with dyestuffs containing an anion in this low proportion by weight. In addition, it is appropriate to select the type of the anion in such a way that the dyestuff which is to be used in accordance with the invention can be obtained in a pure form, free from inorganic salts, in accordance with a procedure with which those skilled in the art are familiar by virtue of their knowledge and experience.

In particular, $X^{(-)}$ denotes the equivalent of the sulfate, phosphate, oxalate or tetrachlorozincate anion or the chloride, bromide, tetrafluoborate, acetate, monochloroacetate, trichloroacetate or trichlorozincate anion or the alko-sulfate anion containing a lower alkyl group, such as the methosulfate or ethosulfate anion, or the thiocyanate anion.

Dyestuffs which may be singled out from the dyestuffs being suitable in accordance with the invention are those in which the cationic charge in the quaternary groups is delocalized (this can be expressed by formulae of various mesomeric structures). It is particularly advantageous to use dyestuffs of the above-mentioned indices M, K and CW which posses a cyclammonium structure.

The process according to the invention is carried out particularly advantageously with dyestuffs suitable in accordance with the invention, which contain one or more other strongly basic groups in addition to the quaternary groups. Examples of such strongly basic groups are primary, secondary or tertiary amino groups which can be linked to the dyestuff chromophor direct or via an aliphatic radical which may contain or be bound with hetero-atoms and/or small organic groups, and also hydrazino or amidino groups; the amino groups can also form part of a heterocyclic ring, such as, for example, the pyridine, imidazole, morpholine, piperidine or piperazine ring. Secondary amino groups are preferably lower monoalkylamino groups or phenylamino or aralkylamino groups, such as, for example, the methylamino, ethylamino or isopropylamino group, or the phenylamino or p-methyl-phenylamino group. Examples of tertiary amino groups are the dimethylamino, diethylamino, N-methylanilino, N-ethylanilino or N-methylbenzylamino group.

Hetero-atoms and fairly small organic groups, which have just been mentioned and were mentioned earlier in the text, and via which the amino or ammonium groups can be linked to an aromatic radical, in the form of a bridge member, are, for example, groups of the formulae —O—, —NH—, —N(lower alkyl)—, —CO—, —SO$_2$—, —CH$_2$—, —CH$_2$—CH$_2$—, —CH$_2$—CH$_2$—CH$_2$—, —CH$_2$—CH(OH)—CH$_2$— and combinations thereof, such as, for example, those which are evident from the examples.

Because the dyestuffs used in the process according to the invention are strongly and rapidly fixed in the polymer, they only exhibit an extremely small amount of bleeding into the coagulation, stretching and washing baths of the wet spinning process. The process according to the invention thus has the great advantage that the dyed filaments produced do not bleed in the baths mentioned or only do so to an extremely small extent. This applies to any of the solvents which can be employed in spin-dyeing and in spinning polymers or copolymers of acrylonitrile and applies especially to the solvents dimethylformamide, dimethylacetamine, dimethyl sulfoxide and ethylene carbonate already mentioned above, and to the aqueous solutions of sodium thiocyanate.

A criterion which can be used to assess the high quality of the process according to the invention is the degree of bleeding (B) which can be expressed in the form of the percentage of dyestuff which bleeds into the coagulation, stretching and washing baths concerned, relative to the dyestuff originally contained in the spinning composition. The degree of bleeding can be determined easily after the spin-dyeing process by measuring the extinction of the said baths at the absorption maximum of the dyestuff used. In the process according to the invention, the degree of dyestuff bleeding into the coagulation, stretching and washing baths of the wet spinning process is in each case not more than 1%, in particular not more than 0.3% into the coagulation and stretching baths and not more than 0.2% into the washing baths.

Compared with known processes, the procedure of the wet spinning process, as carried out by the process according to the invention, in particular exhibits substantial advances.

The quaternary dyestuffs defined above, used in accordance with the process of invention, can belong to the most diverse series of dyestuffs, in particular to the category of quaternary monoazo dyestuffs, quaternary disazo dyestuffs and quaternary methine, azamethine and diazamethine dyestuffs.

Amongst the quaternary monoazo dyestuffs which are used in accordance with the invention, special mention should be made of dyestuffs of the general formula (1)

 (1)

in which $D^{(+)}$ is the radical of a quaternary, aromatic carbocyclic or heterocyclic diazo component which contains one of the abovementioned quaternary groups, $D^{(+)}$ representing, in particular, a pyrazolium, triazolium, thiazolium, thiadiazolium, indazolium, benztriazolium, benzimidazolium, benzthiazolium or benzisothiazolium radical, it being possible for the cyclammonium groups and the aromatic carbocyclic radical fused thereto to be substituted, as described initially, or $D^{(+)}$ being, in particular, an aromatic carbocyclic or heterocyclic radical containing a quaternary ammonium group which is linked to it direct or via a bridge member, for example, as mentioned above, the ammonium group being in particular, a trialkylammonium or dialkylhydrazonium group and the aromatic radicals being, in particular, radicals of benzene, naphthalene and benzthiazole, K is the radical of a coupling component, -in particular the radical of a coupling component from the benzene, naphthalene, such as aminonaphthalene or naphthol, or indole series, preferably from the N,N-dialkylaminobenzene and N,N-dialkylaminonaphthalene series, the N-alkyl-N-aralkylaminobenzene and N-alkyl-N-aralkylaminonaphthalene series, the N,N-bis-(aralkyl)-aminobenzene and N,N-bis-(aralkyl)-aminonaphthalene series, the N-alkyl-N-arylaminobenzene series, the N-alkylindole series, the phenol series and the naphthol series, -which is substituted via a bridge member, for example as mentioned above, by one of the quaternary groups mentioned initially, and may be substituted in the aromatic carbocyclic radicals of the coupling component K preferably by 1, 2 or 3 substituents from the group consisting of lower alkanoylamino, benzoylamino, lower alkyl, lower alkoxy, nitro, hydroxy, amino, lower alkylamino, lower dialkylamino, lower trialkylammonium, chlorine and trifluoromethyl, and the lower N-alkylamino groups are optionally substituted by chlorine, hydroxy, lower alkoxy, aryloxy, cyano, acylamino, such as lower alkanoylamino or benzoylamino, lower carbalkoxy or a primary, secondary, tertiary or quaternary ammonium group which can optionally be a constituent of a 5-membered or 6-membered, heterocyclic ring (cyclammonium radical), by an amidine, guanidine or hydrazine or a thiuronium radical, and $X^{(-)}$ has the meaning mentioned above.

Amongst the quaternary disazo dyestuffs which are used in accordance with the invention, special mention should be made of those of the general formula (3)

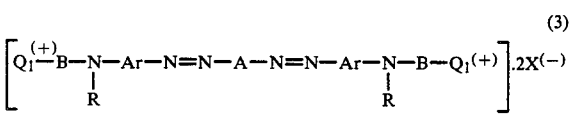 (3)

in which

Ar is a p-phenylene or 1,4-naphthylene radical which can be substituted by 1 or 2 substituents selected from the group comprising lower alkyl, such as methyl or ethyl, lower alkoxy, such as methoxy or ethoxy, halogen, such as chlorine or bromine, nitro, lower alkanoylamino, such as acetylamino, and trifluoromethyl, R is a hydrogen atom or a lower, optionally substituted alkyl radical or an aralkyl or cycloalkyl radical, B is a divalent aliphatic bridge member, in particular an alkylene radical having 1 to 6 C-atoms, preferably 2 to 4 C-atoms, in particular the ethylene or propylene radical, or a lower alkylidene radical, such as the vinylene radical, $Q_1^{(+)}$ is a quaternary ammonium group, in particular a lower trialkylammonium, lower N,N-dialkyl-N-aralkylammonium or lower dialkylhydrazonium group, or a cyclammonium radical, as a special case of the latter a pyridinium or imidazolium radical of the above meaning, it being possible for the formula radicals which occur twice to be identical or different from one another, A is the radical of an aromatic carbocyclic or aromatic heterocyclic tetrazo component, but especially denotes the naphthalene radical or the diphenyl radical or one of the radicals of the formulae

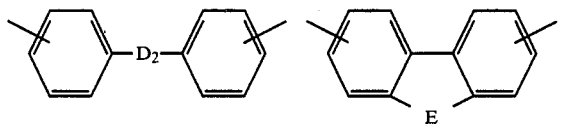

it being possible for the aromatic nuclei in the naphthylene radical and in the diphenylene radical and in these two formulae to be substituted by substituents, preferably 1 or 2 substituents, selected from the group comprising lower alkyl, such as methyl, lower alkoxy, such as methoxy, and chlorine, $D_2$ is *carbocyclic or aromatic-heterocyclic bridge member or a bridge member consisting of simple atomic groupings, for example a bridge member of the formulae —CH$_2$—, —CH$_2$—CH$_2$—, —O—CH$_2$—CH$_2$—O—, —CH=CH—, —NH—, —O—, —S—, —SO$_2$—, —N=N—, —NH—CO—NH—, —CO—NH— or —NH—CO— or of the formula

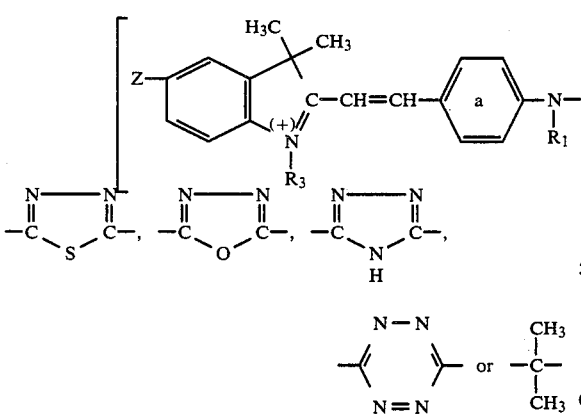

or a cyclohexylene radical, preferably a bridge member of the formula —CH$_2$—, —CH$_2$—CH$_2$—, —CH=CH—, —NH—, —SO$_2$—, —CO—NH— or —NH—CO—,

*an aliphatic or aromatic

E is a group —O—, —S—, —NH— or —SO$_2$, and $X^{(-)}$ has the abovementioned meaning.

Amongst the quaternary disazo dyestuffs which are used in accordance with the invention, special mention should further be made of those of the general formula (4)

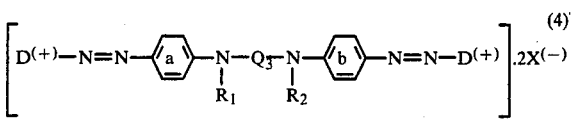

in which the $D^{(+)}$s are identical or different and each has the meaning mentioned above, $Q_3$ is a lower alkylene group, such as, for example, an ethylene or propylene group, a lower alkyleneoxyalkylene group, such as, for example, an ethyleneoxyethylene group, or a lower alkyleneaminoalkylene group, such as diethyleneamino group, or is an alkylene group which has 2 to 8 C-atoms and which is interrupted by two amino groups or oxygen atoms, such as a dioxytriethylene group, or is a lower alkylene group which can be interrupted by an aromatic carbocyclic radical, such as a benzene nucleus or naphthalene nucleus, such as, for example, the m-xylylene or p-xylylene radical, $R_1$ and $R_2$ are identical or different and each represents a hydrogen atom or a lower, optionally substituted alkyl group, or $R_1$ and $R_2$, conjointly with the two nitrogen atoms and the radical $Q_3$, form a heterocyclic ring, such as, for example, a piperazine ring, the benzene nuclei a and b may each have one or two substituents selected from the group comprising lower alkyl, lower alkoxy, halogen, trifluoromethyl and lower alkanoylamino, the substituents in a and b being identical or different, or the nuclei a or b or both each represent with a fused benzene ring a naphthalene radical, and $X^{(-)}$ has the abovementioned meaning.

Amongst the quaternary methine dyestuffs which are used in accordance with the invention, those of the general formula (5)

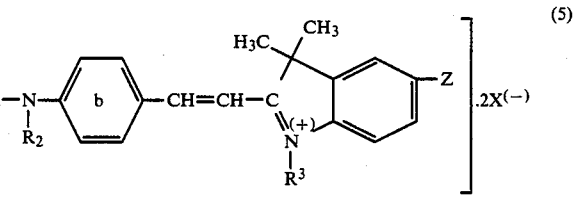

in which $R_1$, $R_2$, $Q_3$, $X^{(-)}$ and the benzene nuclei a and b have the meanings mentioned above, $R_3$ is an aralkyl radical or a lower alkyl unsubstituted, or a lower alkyl substituted, such as a lower alkyl substituted by one or two substituents selected from the group consisting of hydroxy, acetoxy, lower alkoxy, cyano, lower carbalkoxy, chlorine, phenyl, phenyl substituted by substituents selected from the group consisting of halogen, lower alkyl, lower alkoxy, nitro, acetylamino, sulfamoyl and carbamoyl, of carbamoyl and of carbamoyl mono-substituted or di-substituted by lower alkyl, phenyl or benzyl, or such as phenylalkyl the phenyl being unsubstituted or substituted by one or two substituents selected from the group consisting of lower alkyl, lower alkoxy and chlorine, and Z, being identical to or different from one another, each is a hydrogen atom, a halogen atom, such as a chlorine or bromine atom, a lower alkyl group, such as a methyl or ethyl group, a lower alkoxy group, such as a methoxy or ethoxy group, a nitro group, an aryloxy group, such as a phenoxy group, an aralkoxy group, such as a benzyloxy or phenethoxy group, or a lower carbalkoxy group, such as a carbomethoxy or carboethoxy group, should be singled out.

Quaternary dyestuffs used in accordance with the invention and which should be singled out particularly are azamethine dyestuffs of the formula (6)

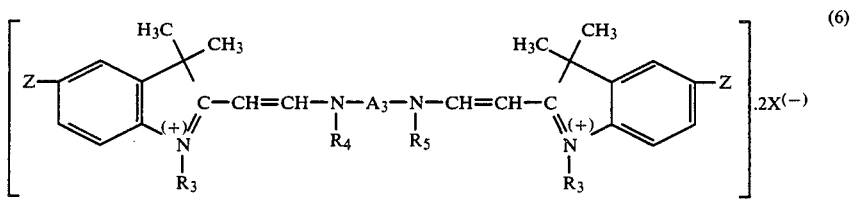 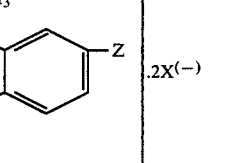

and diazamethine dyestuffs of the formula (7)

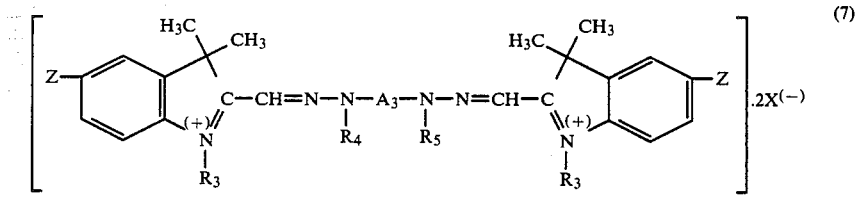 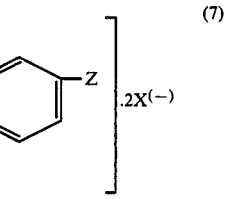

in which $R_3$, Z and $X^{(-)}$ have the abovementioned meanings and $R_4$ and $R_5$ are identical to or different from one another and each is a hydrogen atom or a lower, optionally substituted alkyl group and $A_3$ is a divalent radical which consists of one or more aromatic isocyclic or heterocyclic nuclei which can additionally be linked to one another through a non-aromatic bridge member.

The divalent radical $A_3$ is, for example, the divalent radical of benzene, diphenyl, glycol diphenyl ether, diglycol diphenyl ether, a lower diphenylalkane, diphenyl ether, diphenyl sulfide, diphenyl sulfone, azobenzene or diphenylurea, it being possible for each of the benzene nuclei in these radicals additionally to be substituted by 1 or 2 substituents, preferably from the group comprising lower alkyl, lower alkoxy, halogen, such as bromine and especially chlorine, carbamoyl and sulfamoyl, or $A_3$ is, for example, the divalent radical of 2-phenylbenzimidazole, 2-phenylbenzthiazole, 2-phenylbenzoxazole or diphenyloxadiazole, it being possible for the heterocyclic ring additionally to be substituted by lower alkyl groups, or $A_3$ is the divalent radical of the formula

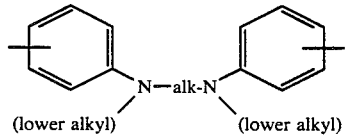

in which alk has the meaning of a lower alkylene radical.

The process according to the invention is carried out particularly advantageously if bis-quaternary dyestuffs of the general formula (4) in which the $D^{(+)}$s are identical or different and each denotes a triazolium, benzthiazolium or thiazolium radical defined above, $Q_3$ is an alkylene group having 2 to 4 C-atoms, $R_1$ and $R_2$ are identical or different and each denotes a lower, optionally substituted alkyl group, preferably a hydrogen atom, and the benzene nuclei a and b and also $X^{(-)}$ have the abovementioned meanings, and also bis-quaternary dyestuffs of the general formulae (5), (6) and (7) in which $Q_3$, $R_1$, $R_2$, a and b and also $X^{(-)}$ have the meanings just mentioned and $A_3$, $R_3$, $R_4$, $R_5$ and Z have the meanings indicated for the formulae (5), (6) and (7), are used.

The dyestuffs which are suitable in accordance with the invention belong to the most diverse categories of dyestuffs, are known in large numbers and can be prepared in analogy to known synthetic processes for these dyestuffs, with which those skilled in the art are familiar, such as, for example, by azo coupling, oxidative coupling, condensation reactions or quaternization reactions.

The quaternary dyestuffs used in accordance with the invention and have the indices mentioned possess a good solubility in the known solvents which are used for spin-dyeing polymers and copolymers of acrylonitrile, such as, for example, dimethylformamide, dimethylacetamide, dimethyl sulfoxide and ethylene carbonate, and in aqueous solutions of sodium thiocyanate, and therefore produce completely clear and speck-free spinning solutions. The solubility of these dyestuffs is so high that it is possible to prepare high strength dyestuff stock solutions in the solvents concerned, even at room temperature. The solubility (S) of the dyestuffs in dimethylformamide, the solvent mostly used in spin-dyeing, is more than 5% by weight, preferably more than 10% by weight, at 20° C.

The quaternary dyestuffs used in accordance with the invention can also be employed in spin-dyeing, if appropriate, as mixtures with non-bleeding organic or inorganic colored pigments, such as, for example, monoazo, disazo, phthalocyanine, quinacridone, naphthalenetetracarboxylic acid, perylenetetracarboxylic acid, dioxazine or anthraquinone pigments and also fluorescent pigments, and also together with carbon black as a black pigment or together with a delustering agent which is customarily used for delustering polymers, such as titanium dioxide, zinc oxide or zinc sulfide; also in this case the quaternary dyestuffs used in accordance with the invention, show no noticeable bleeding into the coagulation, stretching and washing baths in the wet spinning process.

If delustering agents are concomitantly used in the process according to the invention, it is possible to adjust the luster of the spun filaments exactly as required by means of a larger or smaller quantity of delustering agent. This is not possible in the hitherto known processes for spin-dyeing with colored pigments or dopesoluble dyestuffs, since in this case either strongly delustered or completely undelustered filaments are obtained.

If polymer filaments are dyed black with a carbon black pigment by spinning from the spinning composition, it is possible by using simultaneously in the spinning mass the quaternary dyestuffs which have the indices mentioned, to shade the black filaments. In particular, quaternary dyestuffs which have a blue, greenish-tinged blue or red-violet color shade, are used for this purpose. This principle of selecting the color and shade in order to tone black is known. In this case the quaternary dyestuffs used in accordance with the invention, are as a rule employed in the spinning composition in a quantity of about 10 to 35% by weight, relative to the quantity of carbon black used in the spinning composition. In the same way the process according to the invention can be employed to tone white the filaments and fibers of polymers and copolymers of acrylonitrile. This is because polymers and copolymers of acrylonitrile exhibit, after manufacture, a slightly yellowish or brownish color, caused by relatively insignificant impurities, which also applies to filaments and fibers manufactured therefrom. It is possible to compensate for this impure color by means of small quantities of blue or violet dyestuffs; this is known in principle; white-tones fibers and filaments are obtained thereby. In accordance with the process according to the invention white-toning of the spinning composition is effected using the quaternary dyestuffs suitable in accordance with the invention, in a quantity of about 0.0001 to 0.01% by weight, preferably 0.0005 to 0.005% by weight, in each case relative to the polymer itself, and in this case the color shade of these dyestuffs which are used in accordance with the invention should have a blue, greenish-tinged blue or red-violet to blue-violet color.

The process according to the invention can also be carried out with particular advantage when using two or more of the quaternary dyestuffs suitable in accordance with the invention; this combination of quaternary dyestuffs having the above-mentioned characteristic indices, with one another makes it possible to obtain spun filaments which are dyed in a constant shade and with precisely adjusted mixed-nuances. The filaments dyed in a desired completely constant shade, are obtained as a result of the very low bleeding of the various cationic dyestuffs used in combination according to the invention, independently of their structure and independently of the state of regeneration and water content of the coagulation, stretching and washing baths.

In addition to polymers of acrylonitrile, suitable substrates for spinning are copolymers of acrylonitrile with other vinyl compounds, such as, for example, vinylidene cyanide, vinyl chloride, vinylidene chloride, vinyl fluoride, vinyl acetate, vinyl propionate, vinylpyridine, vinylimidazole, vinylpyrrolidone, vinylethanol, acrylic or methacrylic acid, acrylic or methacrylic acid esters, acrylamides or methacrylamides, these copolymers containing at least 50% by weight, preferably at least 85% by weight, of acrylonitrile. The polymers of acrylonitrile or copolymers thereof are preferably acid-modified; they contain acid groups which have been introduced in the form of terminal groups, such as, for example, sulfo or sulfato groups by means of a catalyst into the polymer, or which have been copolymerized in the form of comonomers containing acids groups, such as, for example, styrene-4-sulfonic acid, vinylsulfonic acid, allylsulfonic acid or methallylsulfonic acid.

The quaternary dyestuffs used in accordance with the invention can be added to the spinning solution direct or after preparing a stock solution with the solvent used for dissolving the polymer, such as, for example, dimethylformamide, dimethylacetamide, dimethyl sulfoxide, ethylene carbonate or mixtures thereof with water or aqueous solutions of sodium thiocyanate. After the spinning solution has been homogenized, spinning can be carried out in a manner according to or analogous to a known wet spinning procedure. In the wet spinning procedure the material is spun into a coagulation bath which, in addition to the solvent used for dissolving the polymer, also contains about 30 to 70% by weight, preferably 40 to 60% by weight, of water; after the coagulation bath the filaments thus spun pass through a stretching bath which still contains about 30 to 85% by weight, preferably 40 to 85% by weight, of water, and subsequently a washing bath which still consists of over 70% by weight, preferably 80% by weight, of water or consists entirely of water.

Very deeply colored and completely transparent and speck-free spinning solutions and spun filaments are obtained by the process according to the invention using the quaternary dope-soluble dyestuffs defined above. Because the dyestuffs are strongly fixed in the polymer material, the dyed filaments have excellent fastness to wet processing, such as, for example, fastness to water, washing and perspiration. Owing to the absence of dyestuff aggregates at the surface of the fiber, such as occur, in contrast with this process, when spin-dyeing with colored pigments, the spin-dyed filaments also have excellent fastness to dry and wet rubbing. The quaternary dyestuffs used in accordance with the invention can be combined with one another in the process of the invention in any desired way to give the most diverse formulations of color and shade.

The barely noticeable bleeding of the dyestuffs which are used in accordance with the invention, into the coagulation, stretching and washing baths leads to a very high color yield, to a very high maximum depth of color in the spun filaments, to complete constancy of shade of deystuff mixtures and to completely constant depths of color (no "fading"). The very low bleeding also permits a time-saving and cost-saving change of shade without large intermediate batches, avoids contaminating the regenerated material by decomposition products of the dyestuffs and excludes, to a very great extent, increased outlay on bath regeneration compared with spinning undyed filaments.

The Examples which follow serve to illustrate the invention. The parts and percentages quoted therein are parts by weight and percentages by weight, unless otherwise specified. Parts by volume bear the same relationship to parts by weight as liters of kilograms.

The B values quoted in the Examples represent percentage figures on the bleeding of the dyestuffs which are used in accordance with the invention, from the spun-dyed filaments into the coagulation baths ($B_C$), into the stretching baths ($B_S$) and into the washing baths ($B_W$), calculated on the quantity of dyestuff employed for the quantity of filament spun. In addition, the Examples quote the characteristic indices of the dyestuffs which are used in accordance with the invention, for example, besides the migration factor M, the combination number K and the cation weight CW, the ratio R of cation weight to anion weight and the solubility S of the dyestuff in the solvent which has been used to dissolve the polymer in the particular Example.

EXAMPLE 1

2.8 parts of a 5% strength solution of the dyestuff of the formula

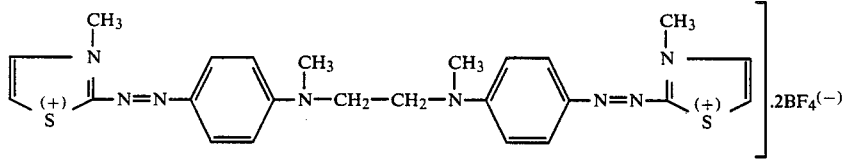

in dimethylformamide are added to 100 parts of a 28% strength solution in dimethylformamide of a polymer consisting of 94% of acrylonitrile, 5% of acrylic acid methyl ester and 1% of sodium methallylsulfonate. The resulting blue-violet spinning solution is homogenized by stirring for a short period and is warmed to 80° C. It is then spun, using a 100-orifice spinneret having an orifice diameter of 80 μm, into a coagulation bath, at 50° C., consisting of 50% by volume of dimethylformamide and 50% by volume of water. In subsequently passing through a stretching bath, at 80° C., consisting of 30% by volume of dimethylformamide and 70% by volume of water, the resulting filaments are stretched and they are then passed through, and washed in, a washing bath consisting of water at 90°-95° C.

Very deeply colored, blue-violet filaments with a high luster and extremely good fastness to water, washing, perspiration and dry and wet rubbing and very good fastness to light are obtained.

The coagulation, stretching and washing baths are only stained to a very small extent. The extent of bleeding of the spun-dyed filaments into the baths was determined as follows: 1 kg of the dyed spinning solution described above was spun at a rate of 8 g/minute into 20 l of the coagulation liquor mentioned above, then stretched in 12 l of the stretching liquor mentioned above and washed in 32 l of the washing liquor mentioned above, these baths being neither regenerated nor supplemented during the spinning process. After completion of the spinning process, a sample was taken from all the baths and the extinction at the adsorption maximum of the dyestuff was determined on this sample photometrically. By comparing the values measured with a calibration curve of the dyestuff used and a conversion based on the bath volumes, it was possible to determine the content of dyestuff bled out in the individual baths as follows:

The coagulation bath contained 2.25 mg of dyestuff, the stretching bath contained 1.13 mg of dyestuff and the washing bath contained 0.03 mg of dyestuff.

The following percentage figures were then calculated for the bleeding in the individual baths:

$B_C = 0.08\%$
$B_S = 0.04\%$
$B_W =$ less than 0.01%.

The thiazolium disazo dyestuff used, described above, has the following indices:

$M = 2$, $K = 1-2$, $CW = 492$, $R = 2.8$ and $S =$ more than 10%.

EXAMPLE 2

0.3 part of a 5% strength solution in dimethylformamide of a dyestuff of the formula

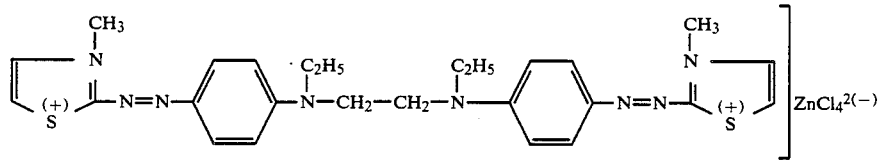

are stirred into 107 parts of a 28% strength solution in dimethylformamide of a polymer consisting of 95% of acrylonitrile, 4.5% of acrylic acid methyl ester and 0.5% of sodium methallylsulfonate. After stirring for a brief period, a completely homogeneous spinning solution is obtained, which is spun, stretched and washed in accordance with the instructions of Example 1. This gives a brilliant violet dyeing with very good fastness properties. Staining in the coagulation, stretching and washing baths is hardly noticeable.

The dyestuff used has the following indices and properties:

$B_C = 0.02\%$
$B_S = 0.01\%$
$B_W =$ less than 0.01%
$M = 2$, $K = 2$, $CW = 520$,
$R = 2.5$, $S =$ more than 10%.

EXAMPLE 3

5 parts of a 10% strength solution in dimethylformamide of a dyestuff of the formula

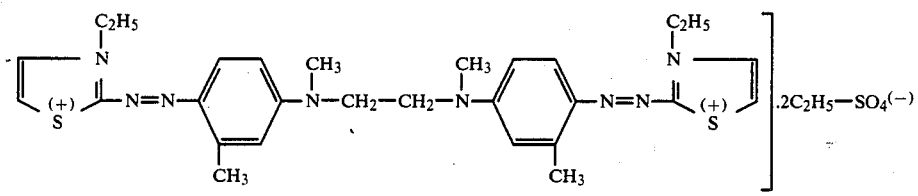

are added to 100 parts of a 28% strength solution in dimethylformamide of a polymer consisting of 85% of acrylonitrile, 13% of vinyl chloride and 2% of sodium methallylsulfonate. The resulting spinning solution, which is dyed navy blue, is homogenized and warmed to 40° C. It is spun into a coagulation bath consisting of 60% by volume of dimethylformamide and 40% by volume of water, stretched in a stretching bath consisting of 50% by volume of dimethylformamide and 50% by volume of water and is then washed in water of 80° to 85° C. This gives lustrous filaments, dyed navy blue, with outstanding fastness properties; there was only very slight bleeding of the dyestuff in the baths.

The dyestuff used has the following indices and properties:
$B_C = 0.20\%$
$B_S = 0.12\%$
$B_W = 0.04\%$
$M = 1$, $K = 2$, $CW = 604$,
$R = 2.7$, $S = $ more than 10%.

EXAMPLE 4

1.3 parts of a 10% strength solution in dimethylacetamide of a dyestuff of the formula

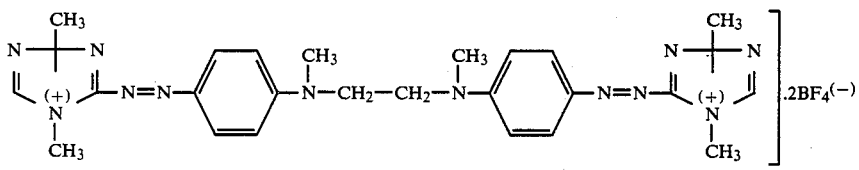

are stirred into 100 parts of a 26% strength solution, at 70° to 80° C., of a polymer consisting of 85% of acrylonitrile, 14.5% of vinyl acetate and 0.5% of sodium methallylsulfonate in dimethylacetamide, a completely homogeneous spinning solution being formed after stirring for a short period. Using a 100-orifice spinneret with an orifice diameter of 100 μm, the spinning solution is spun into a coagulation bath at 80° C., consisting of 70% by volume of dimethylacetamide and 30% by volume of water, then stretched in a stretching bath at 80° C., consisting of 70% by volume of dimethylacetamide and 30% by volume of water and washed in a washing bath at 85°–90° C., consisting of 5% by volume of dimethylacetamide and 95% by volume of water. Lustrous filaments which have been dyed claret-red and which exhibit very good fastness properties, are obtained. There is only very slight bleeding of the dyestuff in the baths.

The dyestuff used has the following indices and properties:
$B_C = 0.06\%$
$B_S = 0.05\%$
$B_W = 0.01\%$
$M = 4$, $K = 2$, $CW = 488$,
$R = 2.8$, $S = $ more than 10%.

EXAMPLE 5

5 parts of a 5% strength solution in dimethylformamide of a dyestuff of the formula

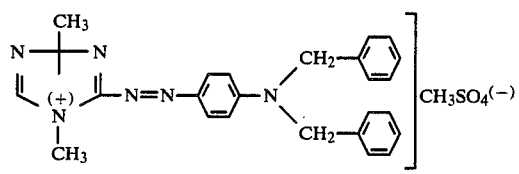

are stirred for a short time with a 25% strength solution of a polymer consisting of 59% of acrylonitrile, 40% of vinylidene chloride and 1% of sodium methallylsulfonate, to give a homogeneous mixture. The resulting spinning composition is warmed to 50° C. and is spun into a coagulation bath at 50° C., consisting of 65% by volume of dimethylformamide and 35% by volume of water, the fibers formed stretched in a bath at a temperature of 80°–85° C., consisting of 35% by volume of dimethylformamide and 65% by volume of water, and washed in water at 90°–95° C. This gives yellowish-tinged red filaments with a high lustre, which scarcely bleed in the baths.

The dyestuff used has the following indices and properties:
$B_C = 0.56\%$
$B_S = 0.22\%$
$B_W = 0.08\%$
$M = 14$, $K = 1$, $CW = 397$,
$R = 3.6$, $S = $ more than 10%.

EXAMPLE 6

If a polymer consisting of 94% of acrylonitrile, 5% of acrylic acid methyl ester and 1% of sodium styrene-4-sulfonate is used instead of the polymer employed in Example 1 and if spinning is carried out in the manner described in Example 1, equivalent, blue-violet filaments are obtained which also have equivalent, good bleeding properties:
$B_C = 0.07\%$
$B_S = 0.04\%$
$B_W = $ less than 0.01%.

EXAMPLE 7

0.36 part of a dyestuff of the formula

M=2, K=1 to 2, CW=483,
R=2.8, S=more than 5%.

EXAMPLE 9

0.5 part of a dyestuff of the formula

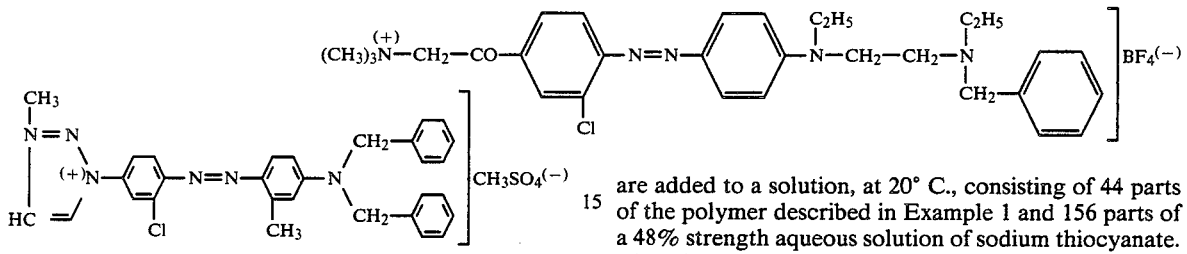

is added to 100 parts of an 18% strength solution, at 80°–90° C., of a polymer described in Example 1, in ethylene carbonate. After being vigorously stirred, the homogeneous spinning composition is spun by the wet spinning process, using a coagulation bath heated to 80° C., consisting of 50% by volume of ethylene carbonate and 50% by volume of water; stretching is then carried out in a bath at 80° C., consisting of 30% by volume of ethylene carbonate and 70% by volume of water and washing is carried out in a bath at a temperature of 70°–80° C., consisting of 5% by volume of ethylene carbonate and 95% by weight of water. Filaments with a very deep red-orange color, excellent luster and very good fastness to wet processing and rubbing are obtained. There is only very slight bleeding in the baths.

The dyestuff has the following indices and properties:
$B_C$=0.6%
$B_S$=0.22%
$B_W$=0.12%
M=15, K=less than 1, CW=524,
R=4.7, S=more than 10%.

EXAMPLE 8

0.1 part of a dyestuff of the formula

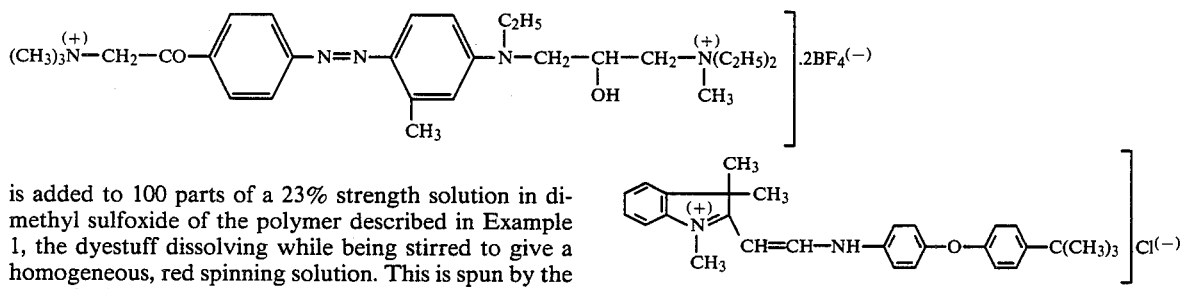

is added to 100 parts of a 23% strength solution in dimethyl sulfoxide of the polymer described in Example 1, the dyestuff dissolving while being stirred to give a homogeneous, red spinning solution. This is spun by the wet spinning process, using a bath at 30° C. consisting of 55% by volume of dimethyl sulfoxide and 45% by volume of water for coagulation; the filaments are then stretched in a bath at 30° C., consisting of 40% by volume of dimethyl sulfoxide and 60% by volume of water and are washed in water heated to 80° C. Luminous red filaments with very high luster and very good fastness properties are obtained; there is only very slight staining in the coagulation, stretching and washing baths.

The dyestuff used has the following indices and properties:
$B_C$=0.20%
$B_S$=0.08%
$B_W$=0.02% are added to a solution, at 20° C., consisting of 44 parts of the polymer described in Example 1 and 156 parts of a 48% strength aqueous solution of sodium thiocyanate. The whole mixture is homogenized by stirring to give a completely clear spinning solution, which is spun into a 10% strength aqueous solution of sodium thiocyanate at a temperature of 20° C., as the coagulation bath; the filament is then stretched in an 8% strength aqueous solution of sodium thiocyanate at 40°–45° C. and washed in water at 70°–80° C. Lustrous, orange-colored filaments with very good fastness to rubbing and wet processing are obtained. There is only negligible staining in the coagulation, stretching and washing baths.

The dyestuff used has the following indices and properties:
$B_C$=0.60%
$B_S$=0.25%
$B_W$=0.18%
M=7, K=1, CW=520,
R=6.0, S=more than 5%.

EXAMPLE 10

0.05 part of a commercial titanium dioxide delustering agent and 2.7 parts of a 10% strength solution in dimethylformamide of the dyestuff of the formula

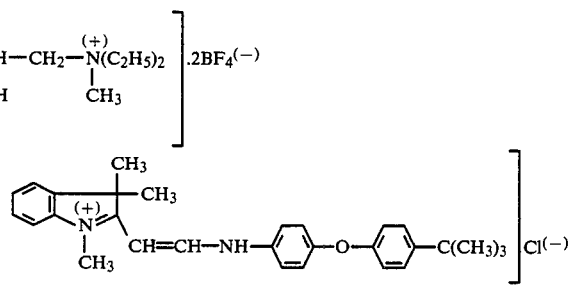

are stirred into 50 parts of a 27% strength solution, at 60° C., of a polymer consisting of 99% of acrylonitrile and 1% of sodium vinylsulfonate in dimethylformamide. The clear spinning solution is spun, stretched and washed in accordance with Example 1. Deeply colored, slightly delustered, yellow filaments with outstanding fastness properties are obtained. There is only slight staining in the baths.

The dyestuff used has the following indices and properties:
$B_C$=0.60%
$B_S$=0.44%
$B_W$=0.06%

M=11, K=1, CW=413,
R=11.8, S=more than 10%.

EXAMPLE 11

Filaments with a quality equivalent to the values indicated in Example 10 are obtained if a commercial zinc oxide delustering agent is used instead of the titanium dioxide delustering agent added to the spinning solution.

EXAMPLE 12

Very deeply colored, blue-violet filaments which, owing to the delustering agent, have a somewhat lower luster, are obtained if the procedure following is as described in Example 1, but, instead of the quantity of 2.8 parts of 5% strength dyestuff solution indicated in that Example, using 6.0 parts of this 5% strength dyestuff solution in dimethylformamide and, additionally, 0.1 part of a commercial zinc sulfide delustering agent. The staining of the coagulation, stretching and washing baths is in the same range as indicated in Example 1.

EXAMPLE 13

100 parts of a polymer consisting of 94% of acrylonitrile, 5% of vinyl acetate and 1% of sodium methallylsulfonate are introduced into 300 parts of dimethylacetamide at 80° C.; a clear polymer solution is obtained, into which 2 parts of a dyestuff of the formula

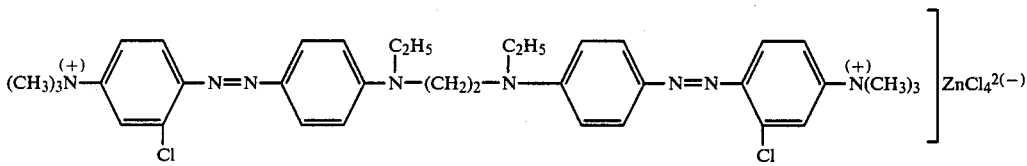

and also 0.5 part of a commercial titanium dioxide delustering agent are stirred. The resulting spinning solution is spun into a coagulation bath, warmed to 30°-40° C., consisting of 50% by volume of dimethylacetamide and 50% by volume of water and is then stretched in a stretching bath, at 60°-65° C., of the same composition and washed in water heated to 90°-95° C. Delustered, very deeply colored, orange filaments with outstanding fastness properties are obtained. The staining of the coagulation, stretching and washing baths is extremely slight.

The dyestuff used has the following indices and properties:
$B_C$=0.24%
$B_S$=0.12%
$B_W$=0.02%
M=3, K=2, CW=661,
R=3.2, S=more than 10%.

EXAMPLE 14

Brilliant, navy blue filaments are obtained with only very slight bleeding of the dyestuff into the baths if the procedure followed is as described in Example 12 but using, instead of the dyestuff employed in that Example, 1 part of the dyestuff of the formula

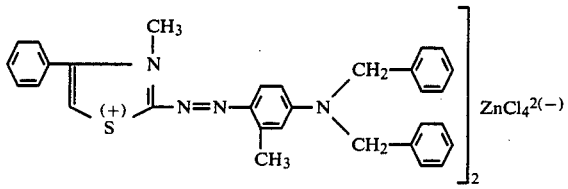

and also 0.5 part of a commercial carbon black pigment instead of the delustering agent.

The dyestuff used here has the following indices and properties:
$B_C$=0.85%
$B_S$=0.48%
$B_W$=0.08%
M=8, K=1 to 2, CW=489,
R=4.7, S=more than 10%.

EXAMPLE 15

Brilliant, navy blue filaments are obtained if the procedure followed is as described in Example 1, but adding 0.14 parts of a commercial carbon black pigment additionally to the spinning solution. Here too, there is only extremely slight bleeding into the baths of the dope-soluble dyestuff employed. The following bleeding figures are found:
$B_C$=0.07%
$B_S$=0.04%
$B_W$=less than 0.01%.

EXAMPLE 16

Very deeply colored, green filaments are obtained if the procedure following is as described in Example 1, but using, besides the dyestuff employed in that Example, additionally 0.14 part of the yellow pigment of the formula

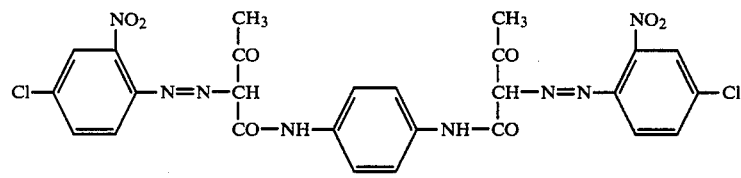

There is only extremely slight bleeding into the baths of the dope-soluble dyestuff, and the same is true of the dope-insoluble, yellow pigment. The dope-soluble dyestuff exhibits the following bleeding figures:
$B_C$=0.09%
$B_S$=0.03%
$B_W$=less than 0.01%.

EXAMPLE 17

If the procedure followed is as described in Example 16, but using 0.14 part of the red pigment of the formula

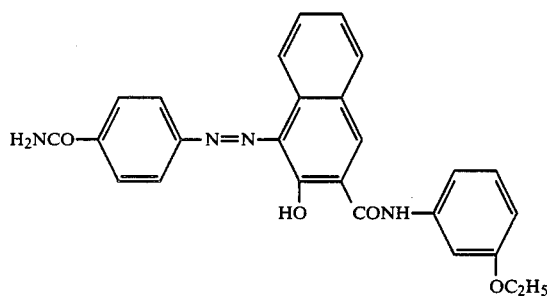

instead of the yellow pigment, very deeply colored, violet filaments are obtained and there is only extremely slight bleeding into the baths of both the dope-soluble dyestuff and the dope-insoluble red pigment. The dope-soluble dyestuff has the following bleeding figures here:

$B_C = 0.07\%$
$B_S = 0.05\%$
$B_W = 0.01\%$

EXAMPLE 18

Very brilliant, green filaments with extremely good fastness properties are obtained if the procedure followed is as described in Example 1, but, instead of the dope-soluble dyestuff employed in that Example, using the dope-soluble dyestuff of the formula

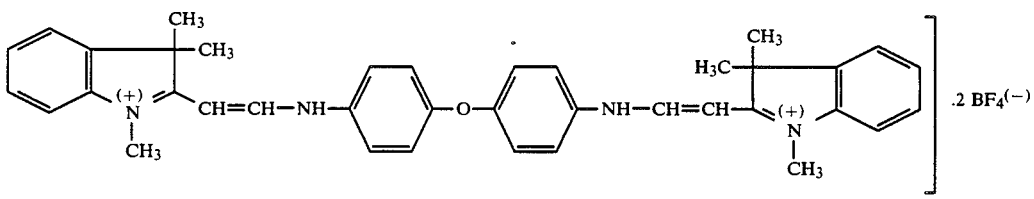

and additionally 0.14 part of a commercial copper phthalocyanine pigment. The coagulation, stretching and washing baths are only stained by the dope-soluble dyestuff to an extremely slight degree.

The dyestuff used in accordance with the invention has the following indices and properties:

$B_C = 0.09\%$
$B_S = 0.05\%$
$B_W = 0.01\%$
$M = 3$, $K = 2$, $CW = 568$,
$R = 3.3$, $S =$ more than 10%.

EXAMPLES 19 TO 96

Spun-dyed filaments with excellent properties are also obtained if the procedure followed is as described in Example 1, but using one of the dope-soluble dyestuffs described in the following test instead of the dope-soluble dyestuffs employed in that Example.

The color shades of the filaments obtained and also the indices and other figures for the dyestuffs used in Examples 19 to 96 are to be found set out in tabular form subsequent to the dyestuff formulae.

| Example | Dyestuff |
|---|---|
| 19 | 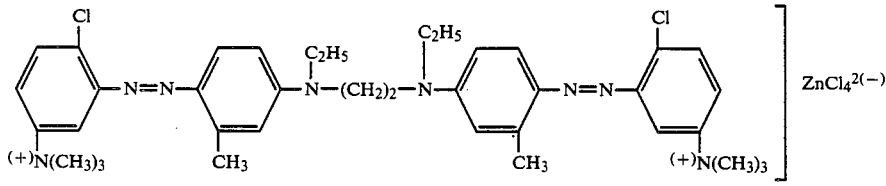 |
| 20 | 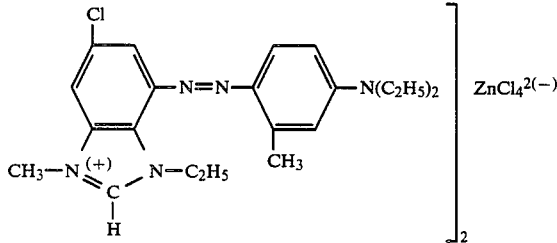 |

| Example | Dyestuff |
|---|---|
| 21 | 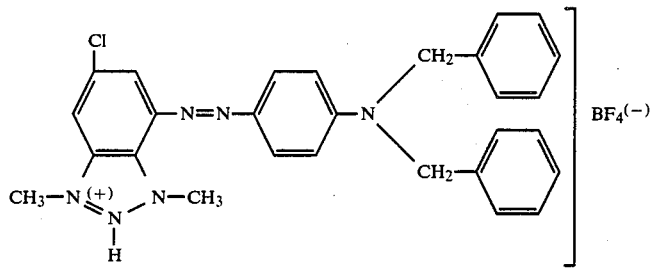 |
| 22 | 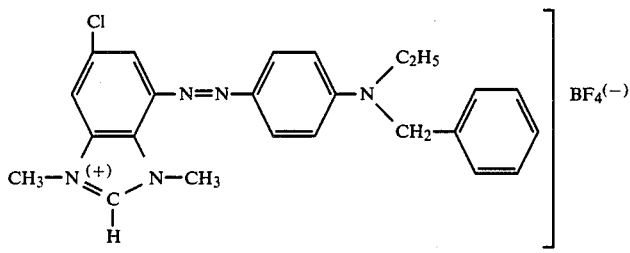 |
| 23 | 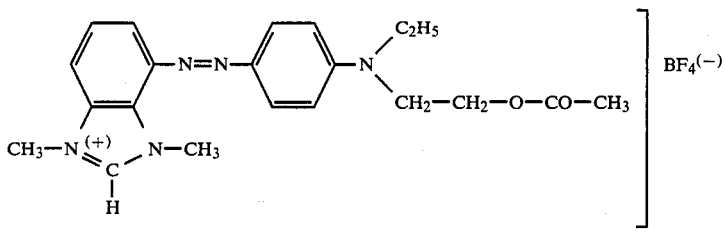 |
| 24 | 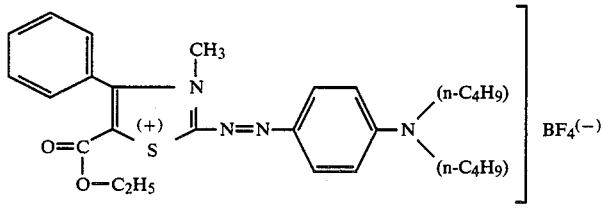 |
| 25 | 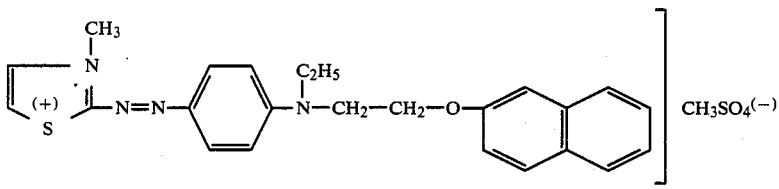 |
| 26 | 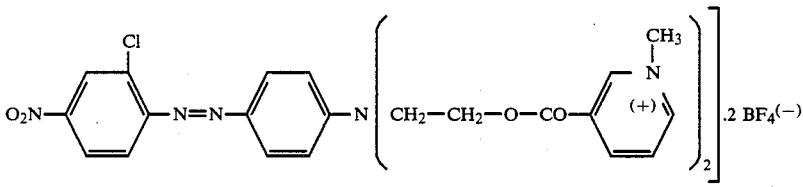 |

| Example | Dyestuff |
|---|---|
| 27 | 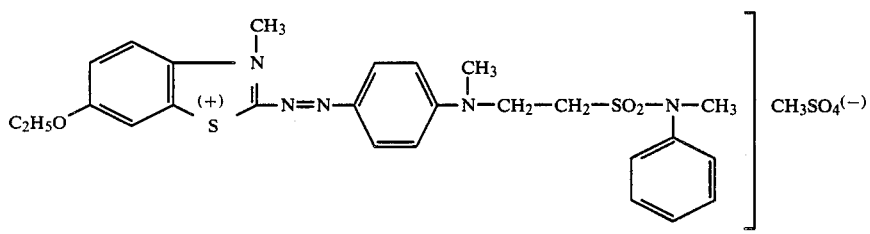 CH₃SO₄⁽⁻⁾ |
| 28 | 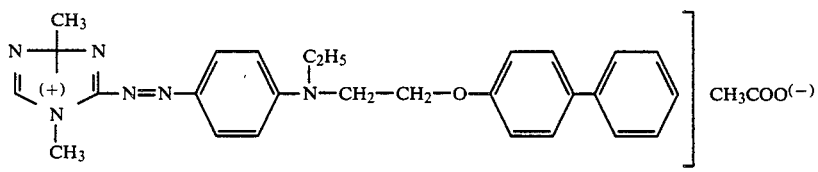 CH₃COO⁽⁻⁾ |
| 29 | 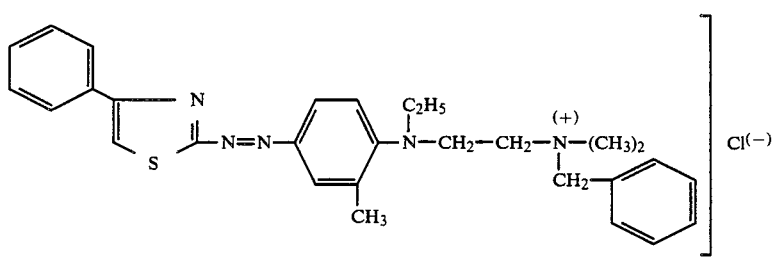 Cl⁽⁻⁾ |
| 30 | 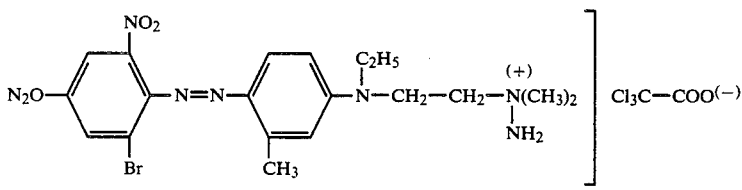 Cl₃C—COO⁽⁻⁾ |
| 31 | 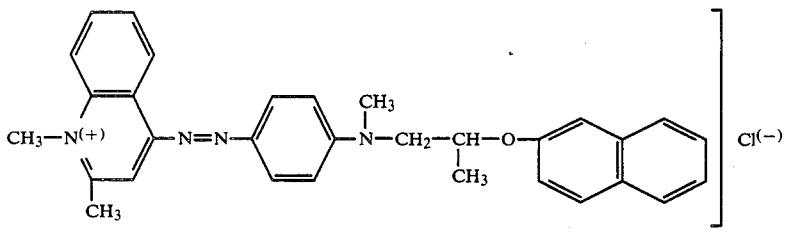 Cl⁽⁻⁾ |
| 32 | 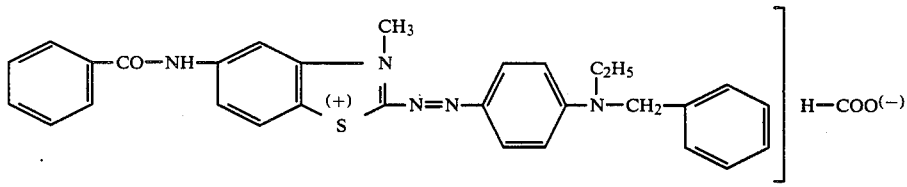 H—COO⁽⁻⁾ |
| 33 | 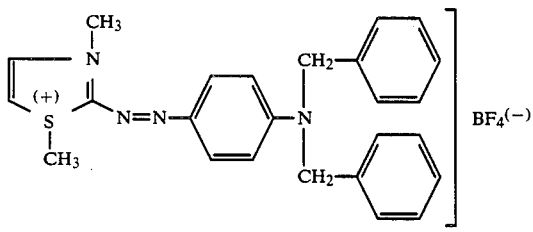 BF₄⁽⁻⁾ |

| Example | Dyestuff |
|---|---|
| 34 | 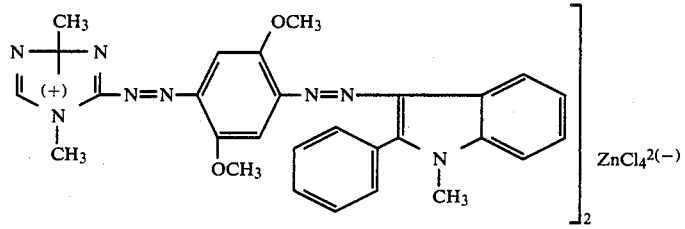 |
| 35 | 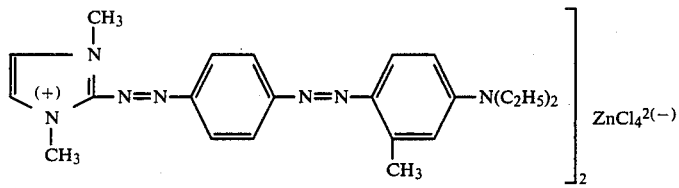 |
| 36 | 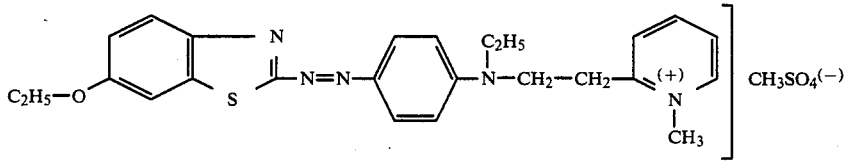 |
| 37 | 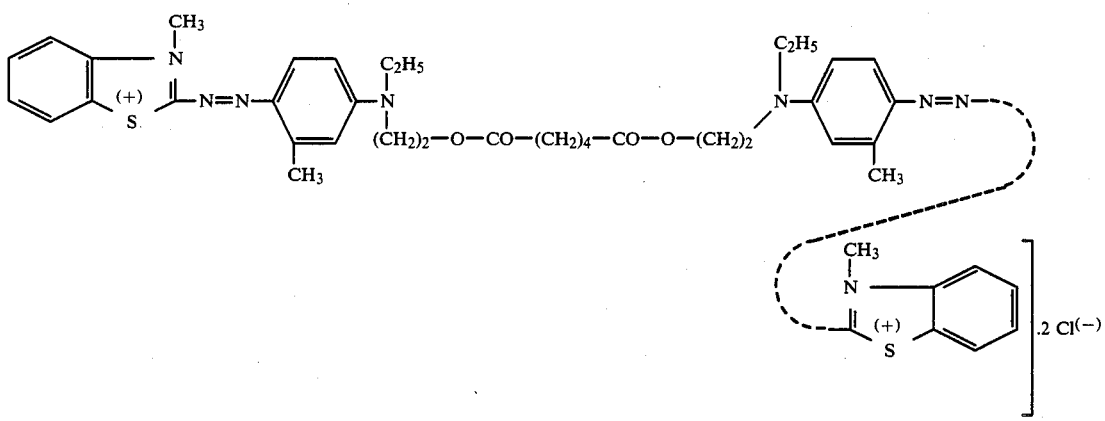 |
| 38 | 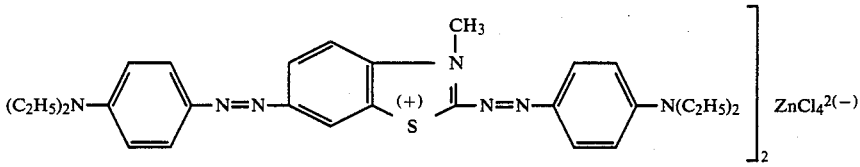 |
| 39 | 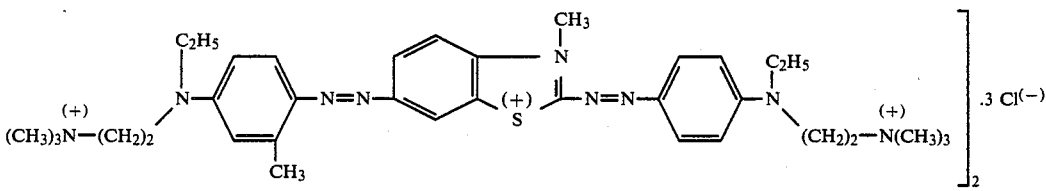 |

-continued
| Example | Dyestuff |
|---|---|
| 40 | 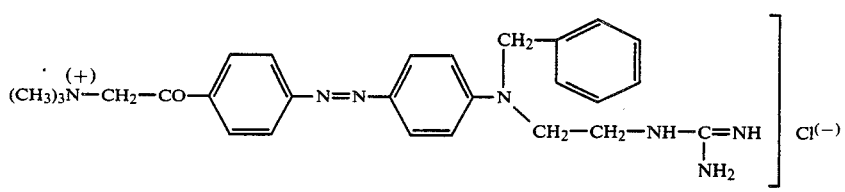 |
| 41 | 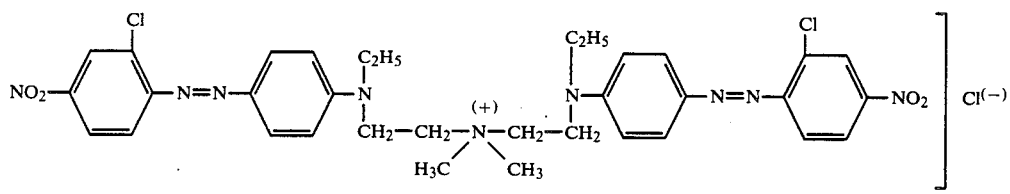 |
| 42 | 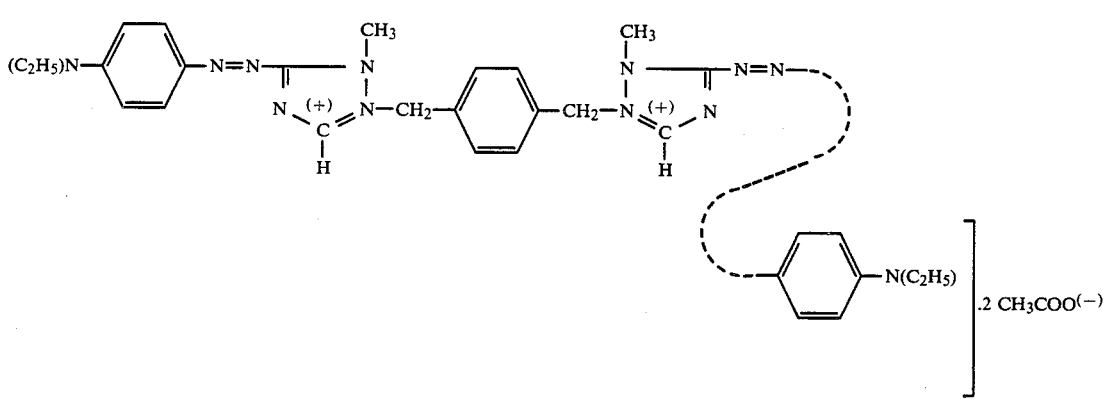 |
| 43 | 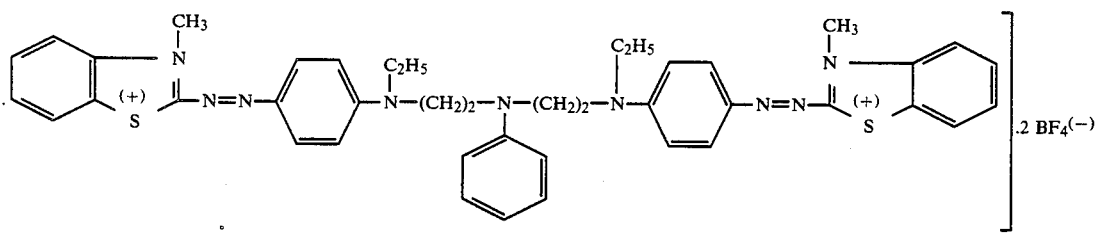 |
| 44 | 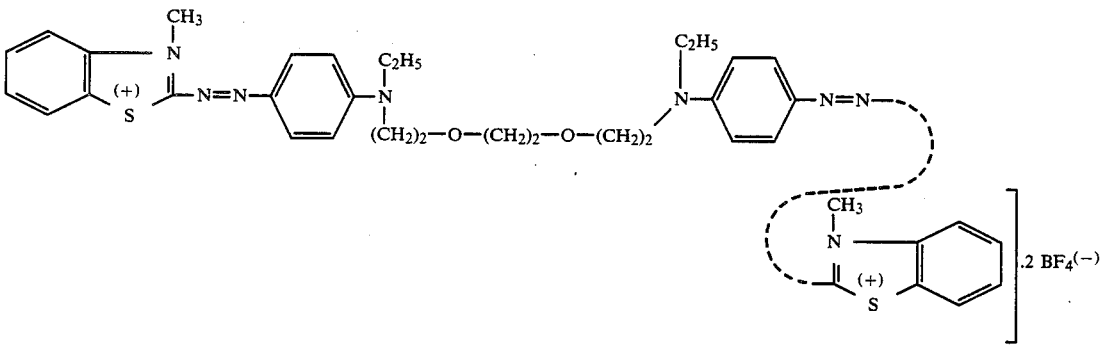 |
| 45 | 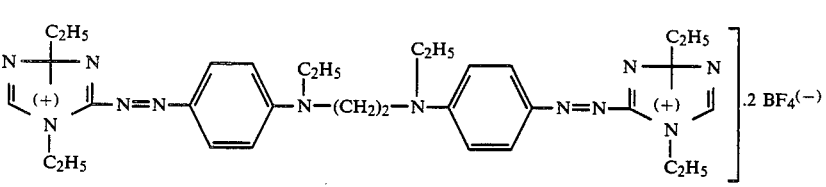 |

| Example | Dyestuff |
|---|---|
| 46 | 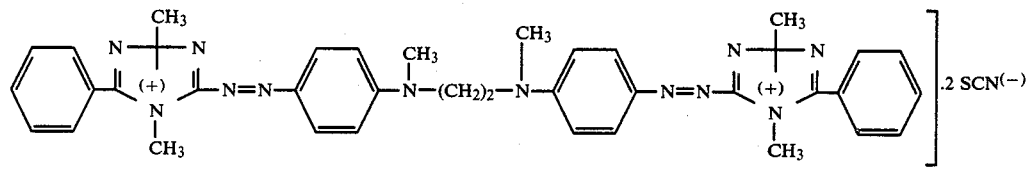 |
| 47 | 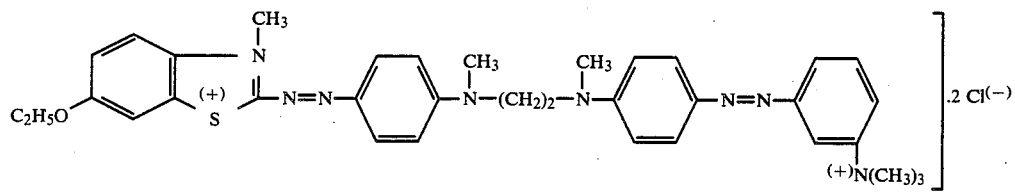 |
| 48 | 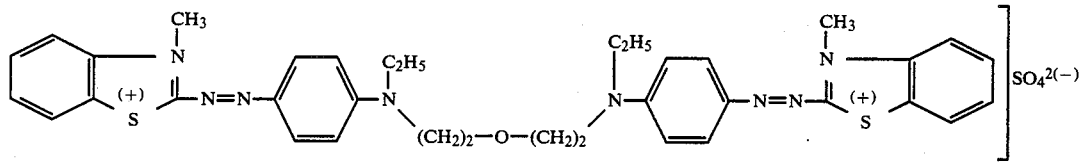 |
| 49 | 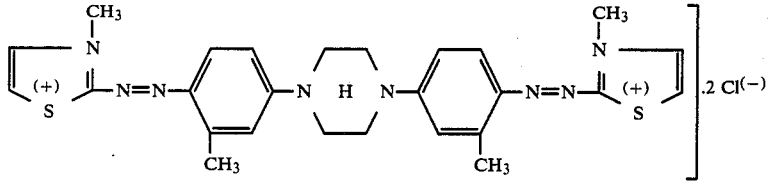 |
| 50 | 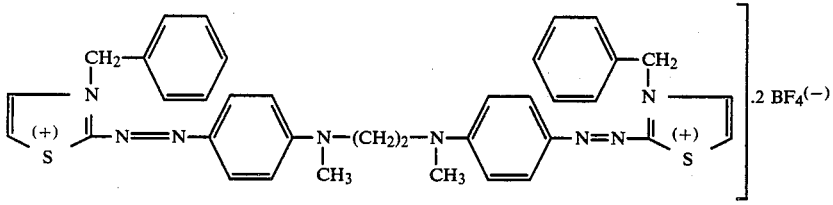 |
| 51 | 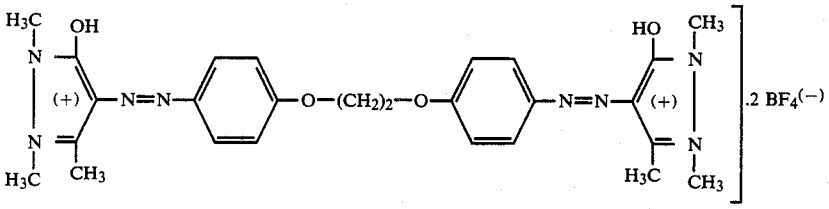 |
| 52 | 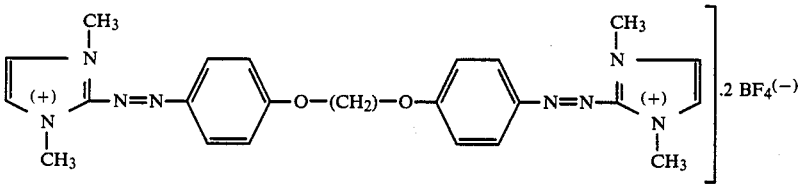 |

| Example | Dyestuff |
|---|---|
| 53 | 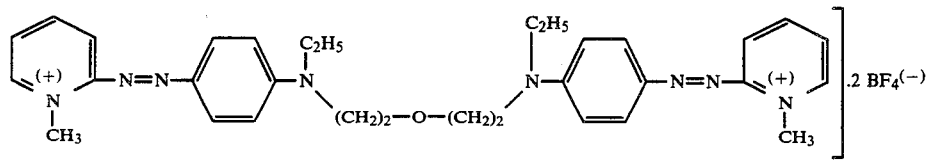 |
| 54 | 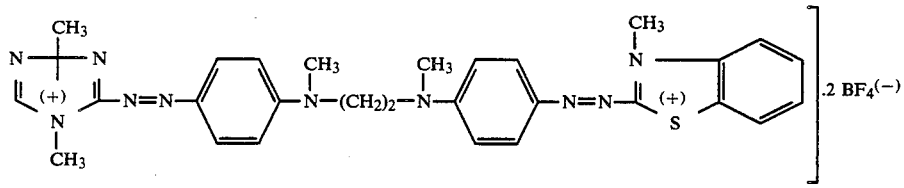 |
| 55 | 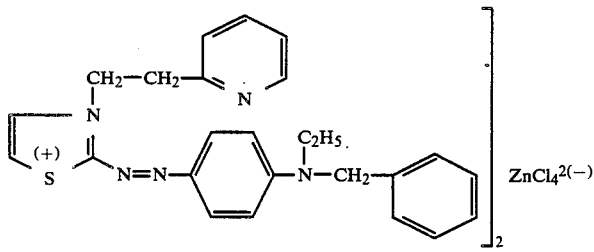 |
| 56 | 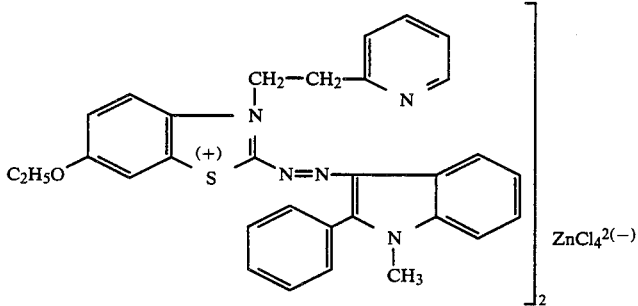 |
| 57 | 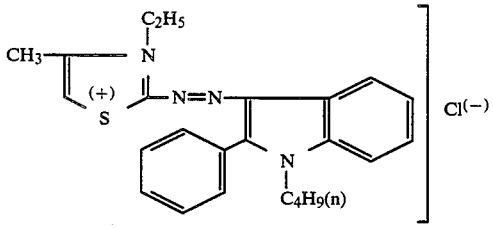 |
| 58 | 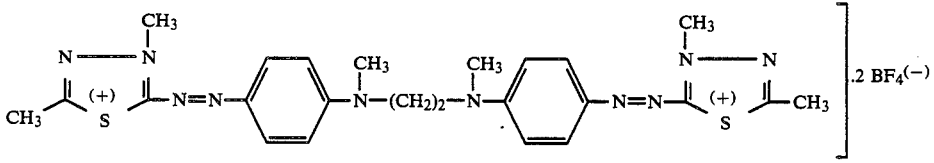 |
| 59 | 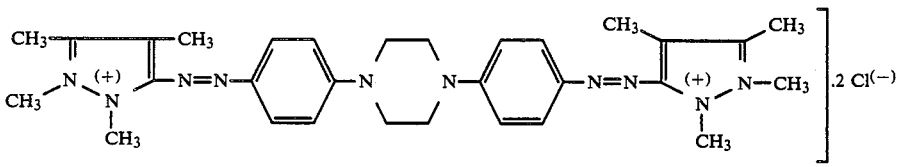 |

| Example | Dyestuff |
|---|---|
| 60 | 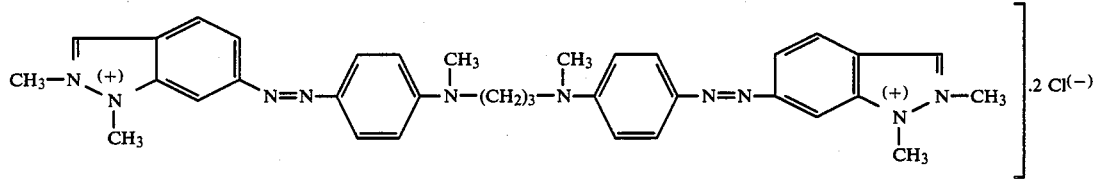 |
| 61 | 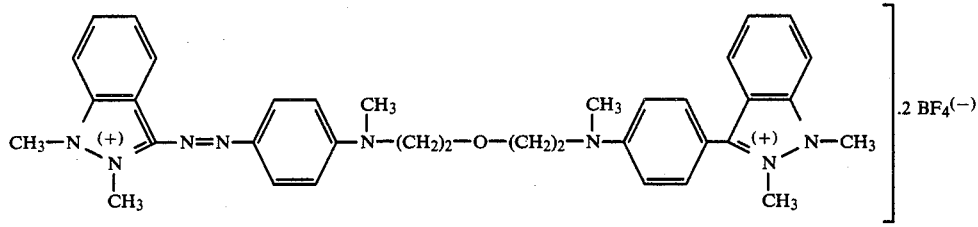 |
| 62 | 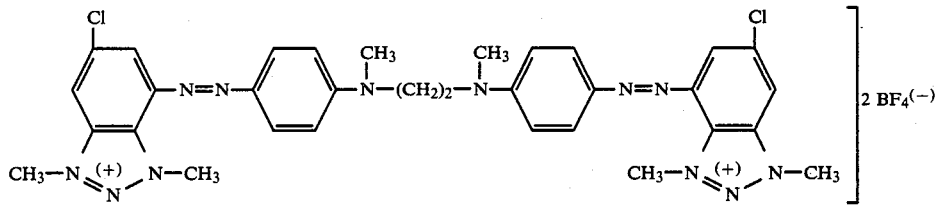 |
| 63 | 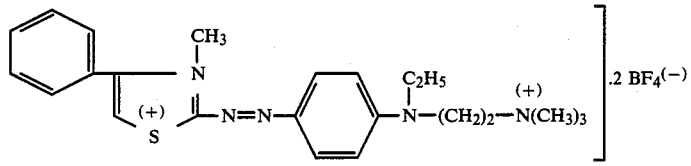 |
| 64 | 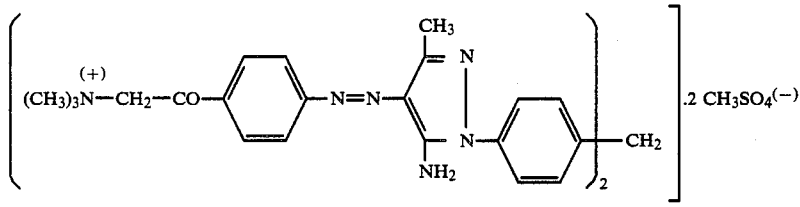 |
| 65 | 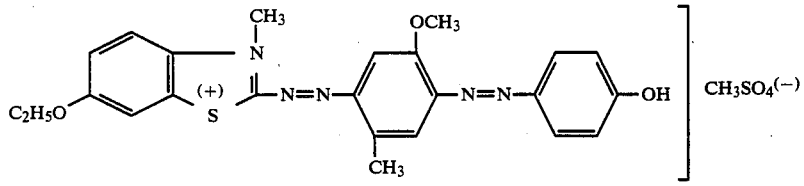 |
| 66 | 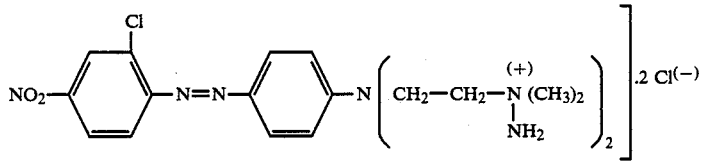 |

| Example | Dyestuff |
|---|---|
| 67 | 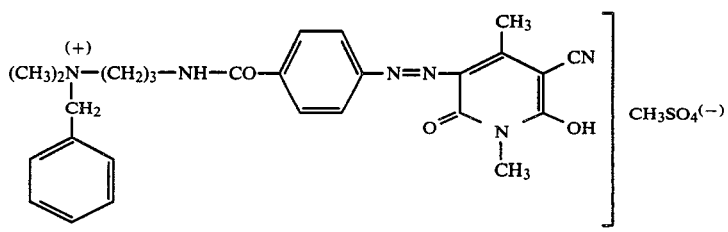 CH₃SO₄⁽⁻⁾ |
| 68 | 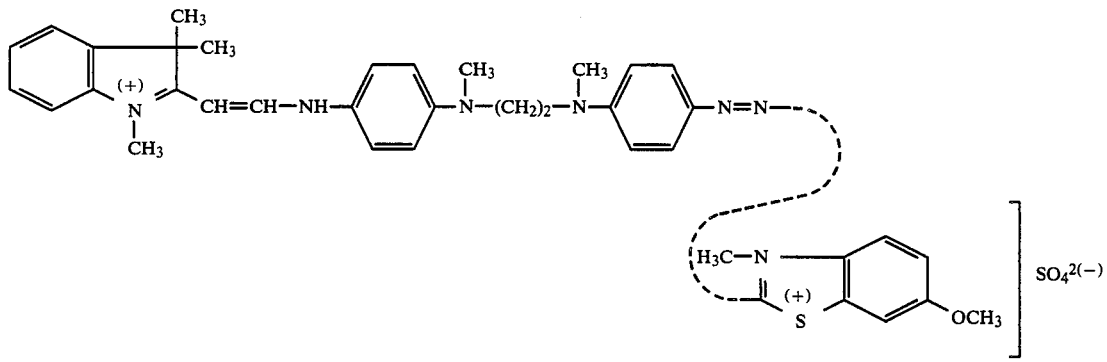 SO₄²⁽⁻⁾ |
| 69 | 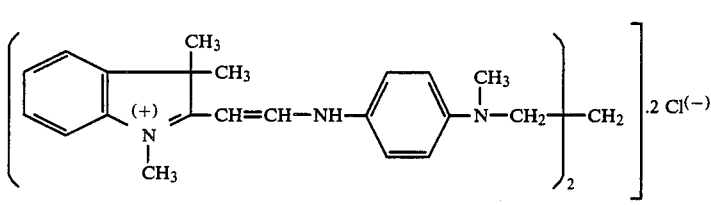 .2 Cl⁽⁻⁾ |
| 70 | 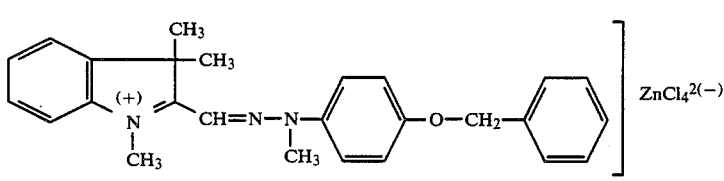 ZnCl₄²⁽⁻⁾ |
| 71 | 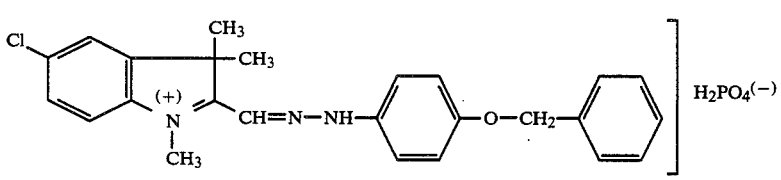 H₂PO₄⁽⁻⁾ |
| 72 | 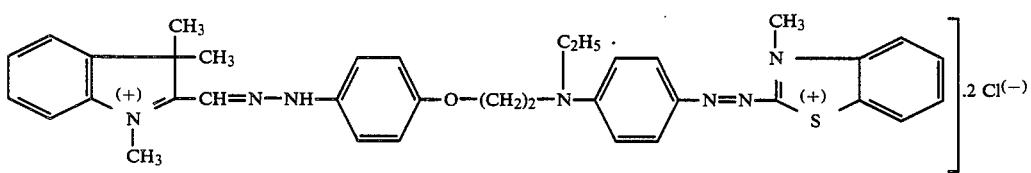 .2 Cl⁽⁻⁾ |
| 73 | 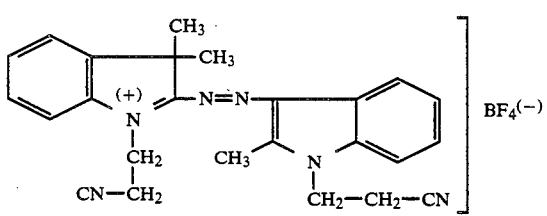 BF₄⁽⁻⁾ |

-continued
| Example | Dyestuff |
|---|---|
| 74 | 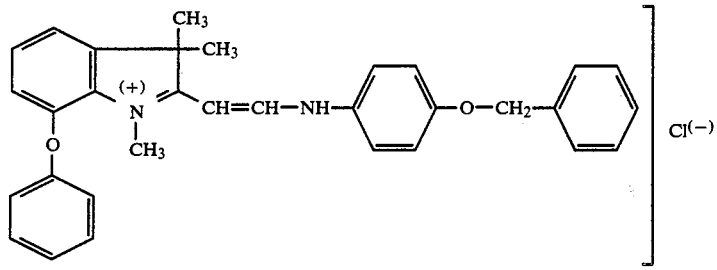 |
| 75 | 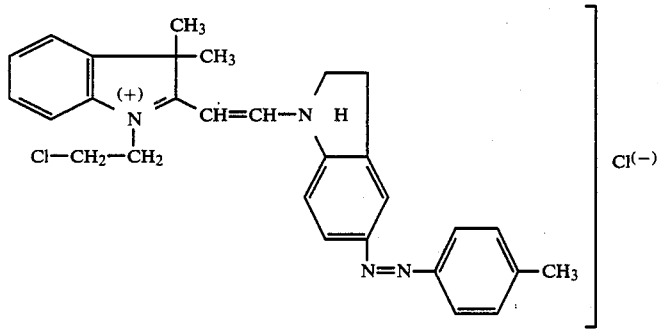 |
| 76 | 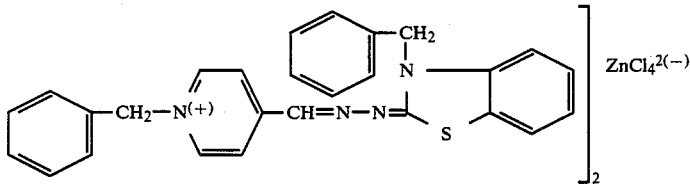 |
| 77 | 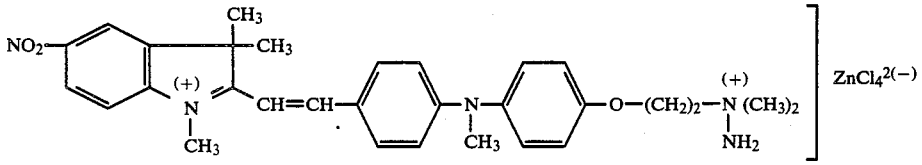 |
| 78 | 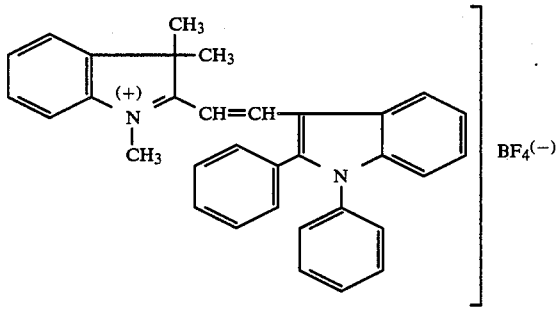 |

-continued
| Example | Dyestuff |
|---|---|
| 79 | 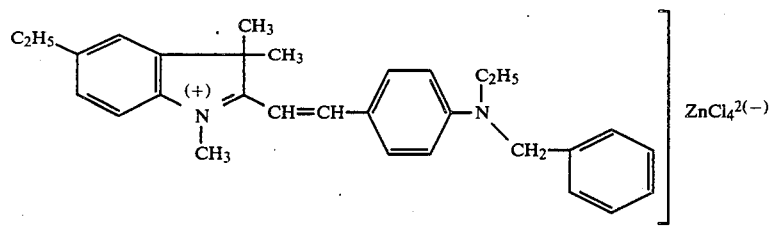 ZnCl$_4^{2(-)}$ |
| 80 | 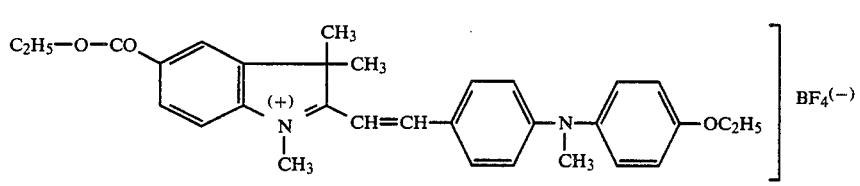 BF$_4^{(-)}$ |
| 81 | 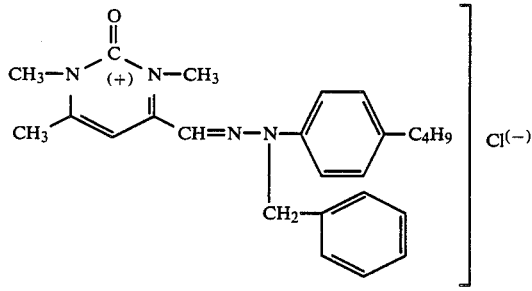 Cl$^{(-)}$ |
| 82 | 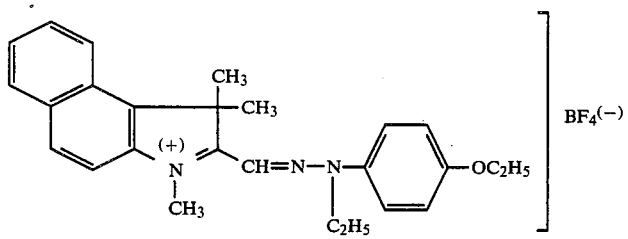 BF$_4^{(-)}$ |
| 83 | 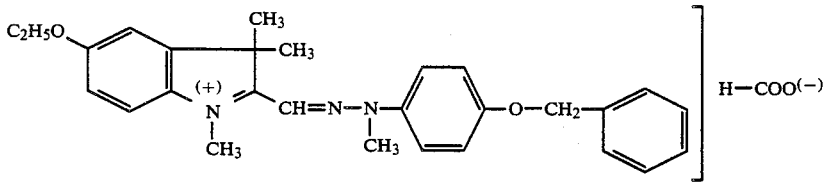 H—COO$^{(-)}$ |
| 84 | 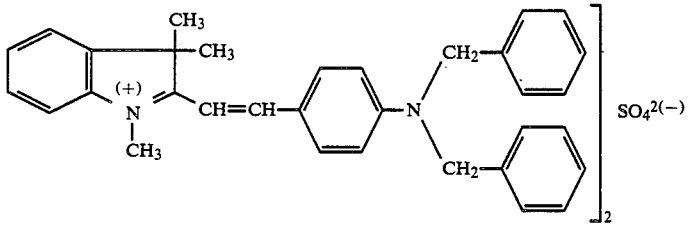 SO$_4^{2(-)}$ |

| Example | Dyestuff |
|---|---|
| 85 | 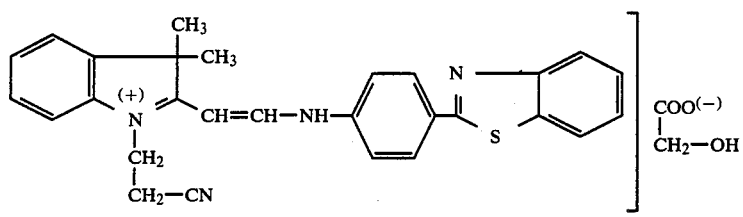 |
| 86 | 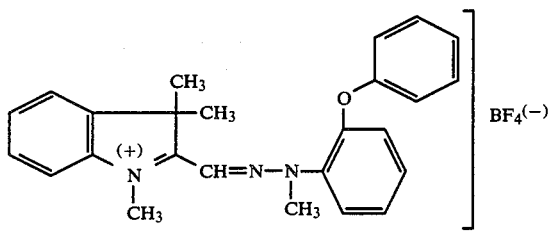 |
| 87 | 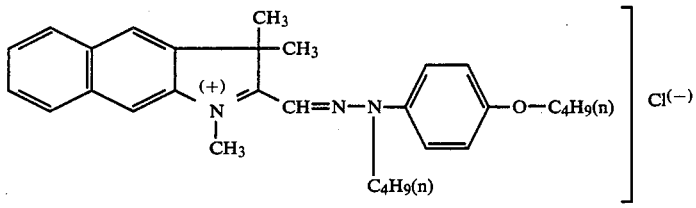 |
| 88 | 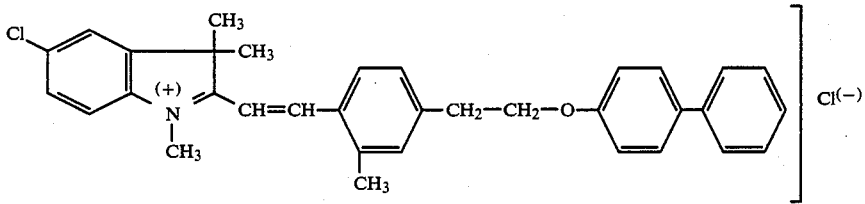 |
| 89 | 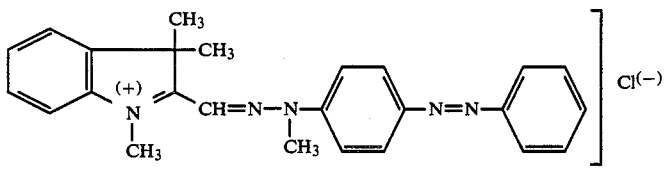 |
| 90 | 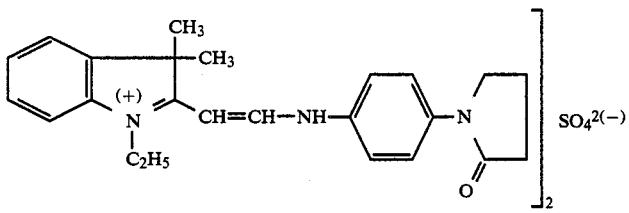 |
| 91 | 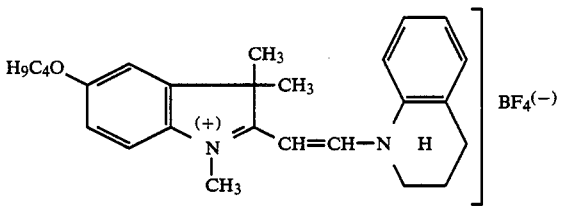 |

| Example | Dyestuff |
|---|---|
| 92 | 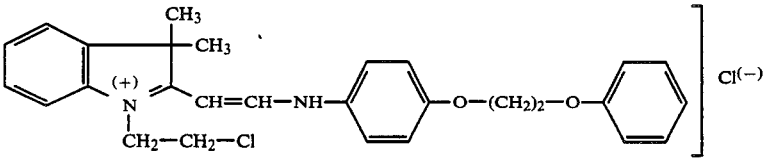 Cl(−) |
| 93 | 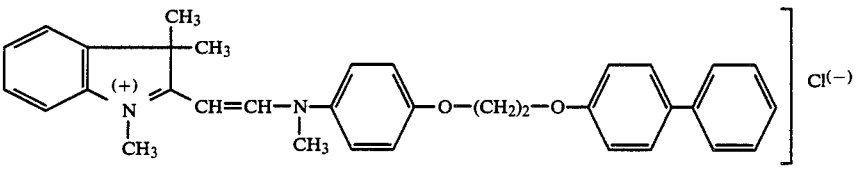 Cl(−) |
| 94 | 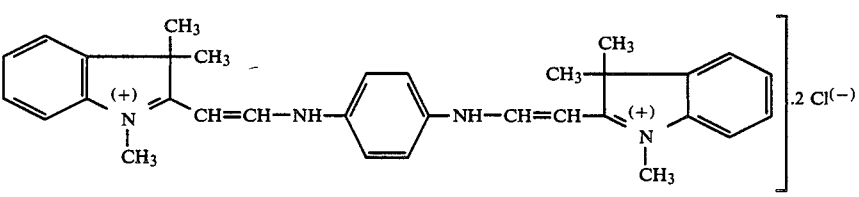 .2 Cl(−) |
| 95 | 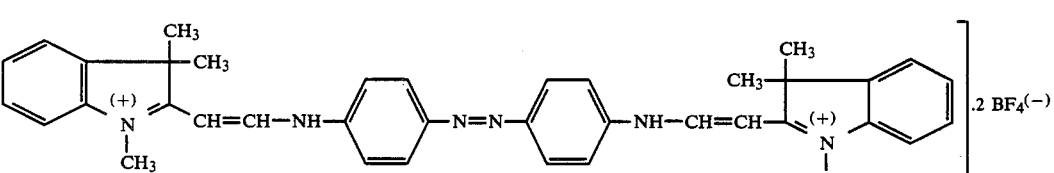 .2 BF₄(−) |
| 96 | 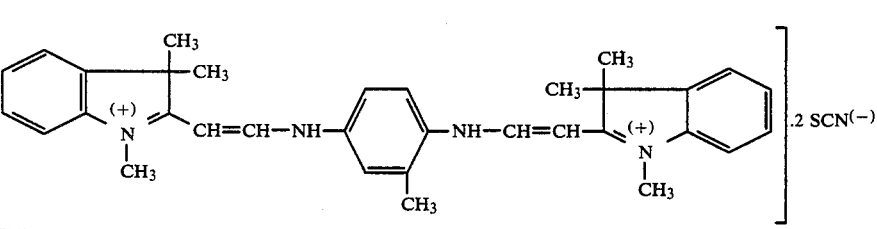 .2 SCN(−) |
Indices and properties of the dyestuffs in Examples 19–96 and the color shades of the filaments which have been spun-dyed with these dyestuffs:
| Example | $B_C$ (%) | $B_S$ (%) | $B_W$ (%) | M | K | CW | R | S (in DMF) more than ... % | Color shade |
|---|---|---|---|---|---|---|---|---|---|
| 19 | 0.06 | 0.05 | <0.01 | 1 | 2 | 618 | 3.0 | 10 | orange |
| 20 | 0.28 | 0.08 | 0.02 | 16 | 1–2 | 384 | 3.8 | 10 | red |
| 21 | 0.16 | 0.08 | 0.02 | 11 | 1 | 480 | 5.5 | 10 | red |
| 22 | 0.42 | 0.36 | 0.10 | 18 | 1–2 | 420 | 4.8 | 10 | red |
| 23 | 0.52 | 0.28 | 0.14 | 20 | 2 | 414 | 4.8 | 10 | red |
| 24 | 0.08 | 0.06 | <0.01 | 4 | 1 | 479 | 5.5 | 5 | blue |
| 25 | 0.56 | 0.36 | 0.12 | 13 | 1 | 423 | 3.9 | 10 | blue violet |
| 26 | 0.07 | 0.05 | <0.01 | 4 | 2 | 604 | 3.5 | 5 | yellowish-tinged red |
| 27 | 0.58 | 0.58 | 0.16 | 18 | 2 | 524 | 4.7 | 5 | blue |
| 28 | 0.24 | 0.22 | 0.04 | 14 | 2 | 441 | 7.5 | 10 | blueish-tinged red |
| 29 | 0.68 | 0.29 | 0.18 | 20 | 1 | 485 | 13.9 | 10 | red |
| 30 | 0.85 | 0.43 | 0.18 | 20 | 1–2 | 463 | 2.9 | 5 | violet |
| 31 | 0.50 | 0.24 | 0.12 | 15 | 1 | 461 | 13.2 | 10 | blue |

-continued

| Example | $B_C$ (%) | $B_S$ (%) | $B_W$ (%) | M | K | CW | R | S (in DMF) more than ... % | Color shade |
|---|---|---|---|---|---|---|---|---|---|
| 32 | 0.18 | 0.20 | 0.06 | 13 | 1 | 506 | 11.2 | 5 | blue |
| 33 | 0.72 | 0.30 | 0.16 | 20 | 1-2 | 395 | 4.5 | 10 | red |
| 34 | 0.16 | 0.10 | 0.06 | 10 | 1-2 | 495 | 4.8 | 5 | reddish-tinged blue |
| 35 | 0.32 | 0.18 | 0.04 | 14 | 1-2 | 390 | 3.8 | 5 | blue |
| 36 | 0.90 | 0.45 | 0.30 | 20 | 2 | 446 | 4.0 | 10 | red |
| 37 | 0.05 | 0.03 | <0.01 | 1 | 2 | 820 | 11.6 | 10 | reddish tinged blue |
| 38 | 0.22 | 0.10 | 0.02 | 6 | 1 | 500 | 4.8 | 5 | blue |
| 39 | 0.02 | 0.01 | <0.01 | 1 | 1-2 | 644 | 8.1 | 5 | blue |
| 40 | 0.60 | 0.32 | 0.20 | 18 | 1-2 | 472 | 13.5 | 5 | orange |
| 41 | 0.16 | 0.10 | 0.04 | 5 | 1 | 707 | 20.2 | 5 | yellowish-tinged red |
| 42 | 0.05 | 0.01 | <0.01 | 2 | 1 | 620 | 10.5 | 10 | blueish-tinged red |
| 43 | 0.05 | 0.04 | <0.01 | 3 | 1-2 | 739 | 4.2 | 10 | violet |
| 44 | 0.05 | 0.05 | <0.01 | 2 | 1-2 | 768 | 4.4 | 10 | blue |
| 45 | 0.14 | 0.08 | <0.01 | 1 | 2 | 572 | 3.3 | 10 | blueish-tinged red |
| 46 | 0.02 | <0.01 | <0.01 | 1 | 1-2 | 640 | 5.5 | 10 | red |
| 47 | 0.10 | 0.04 | 0.01 | 3 | 1-2 | 622 | 8.8 | 10 | green |
| 48 | 0.08 | 0.07 | 0.01 | 2 | 2 | 664 | 6.9 | 10 | violet |
| 49 | 0.11 | 0.07 | 0.01 | 3 | 1-2 | 518 | 7.3 | 10 | violet |
| 50 | 0.05 | 0.03 | <0.01 | 1 | 1 | 644 | 3.7 | 10 | violet |
| 51 | 0.28 | 0.27 | 0.10 | 6 | 2 | 520 | 3.0 | 5 | yellow |
| 52 | 0.20 | 0.10 | 0.02 | 4 | 2 | 460 | 2.6 | 10 | yellow |
| 53 | 0.14 | 0.05 | 0.02 | 5 | 2 | 552 | 7.8 | 10 | red-violet |
| 54 | 0.06 | 0.03 | <0.01 | 2 | 2 | 540 | 3.1 | 10 | red-violet |
| 55 | 0.56 | 0.20 | 0.12 | 18 | 1 | 428 | 4.1 | 10 | blue |
| 56 | 0.19 | 0.10 | 0.05 | 12 | 1-2 | 518 | 5.0 | 10 | blueish-tinged red |
| 57 | 0.25 | 0.16 | 0.09 | 10 | 1 | 403 | 11.5 | 5 | red |
| 58 | 0.09 | 0.12 | 0.02 | 3 | 2 | 522 | 3.0 | 10 | yellowish tinged red |
| 59 | 0.11 | 0.04 | 0.02 | 1 | 1-2 | 540 | 7.6 | 5 | red |
| 60 | 0.04 | 0.01 | <0.01 | 1 | 1-2 | 599 | 8.4 | 5 | red |
| 61 | 0.11 | 0.04 | 0.01 | 4 | 1-2 | 630 | 3.6 | 10 | red |
| 62 | 0.08 | 0.06 | <0.01 | 2 | 1-2 | 705 | 4.1 | 10 | claret |
| 63 | 0.40 | 0.22 | 0.08 | 9 | 2 | 409 | 2.5 | 10 | violet |
| 64 | 0.15 | 0.08 | 0.03 | 4 | 2 | 766 | 3.5 | 5 | golden-yellow |
| 65 | 0.56 | 0.36 | 0.08 | 18 | 2 | 462 | 4.2 | 5 | blue |
| 66 | 0.30 | 0.10 | 0.05 | 5 | 2 | 450 | 6.2 | 5 | yellowish tinged red |
| 67 | 0.95 | 0.60 | 0.25 | 15 | 2 | 487 | 4.4 | 5 | yellow |
| 68 | 0.06 | 0.02 | <0.01 | 1 | 2 | 633 | 6.6 | 10 | green |
| 69 | 0.09 | 0.01 | <0.01 | 1 | 1-2 | 652 | 9.2 | 10 | yellow |
| 70 | 0.50 | 0.28 | 0.04 | 10 | 1-2 | 392 | 3.8 | 10 | golden-yellow |
| 71 | 0.50 | 0.20 | 0.10 | 9 | 1 | 413 | 4.3 | 10 | yellow |
| 72 | 0.09 | 0.05 | <0.01 | 2 | 2 | 618 | 8.7 | 10 | green |
| 73 | 0.50 | 0.38 | 0.08 | 19 | 1-2 | 407 | 4.7 | 5 | red |
| 74 | 0.36 | 0.20 | 0.10 | 16 | 1 | 475 | 13.6 | 10 | greenish tinged yellow |
| 75 | 0.28 | 0.18 | 0.04 | 12 | 1 | 469 | 13.4 | 5 | golden-yellow |
| 76 | 0.60 | 0.30 | 0.10 | 18 | 1 | 437 | 4.2 | 10 | golden-yellow |
| 77 | 0.20 | 0.12 | 0.03 | 2 | 2 | 515 | 2.5 | 10 | blue |
| 78 | 0.60 | 0.28 | 0.16 | 20 | 1-2 | 464 | 5.3 | 10 | orange |
| 79 | 0.68 | 0.35 | 0.20 | 15 | 1 | 423 | 4.1 | 10 | red |
| 80 | 0.32 | 0.20 | 0.06 | 15 | 1 | 483 | 5.6 | 10 | violet |
| 81 | 0.65 | 0.36 | 0.10 | 19 | 1-2 | 404 | 11.5 | 5 | golden-yellow |
| 82 | 0.45 | 0.18 | 0.08 | 20 | 1-2 | 406 | 4.7 | 5 | orange |
| 83 | 0.36 | 0.14 | 0.05 | 10 | 1 | 432 | 9.6 | 10 | orange |
| 84 | 0.66 | 0.64 | 0.22 | 20 | 1-2 | 457 | 9.5 | 10 | red |
| 85 | 0.55 | 0.20 | 0.08 | 20 | 1 | 449 | 6.0 | 5 | yellow |
| 86 | 0.38 | 0.18 | 0.04 | 18 | 1-2 | 390 | 4.5 | 10 | greenish-tinged yellow |

| Example | $B_C$ (%) | $B_S$ (%) | $B_W$ (%) | M | K | CW | R | S (in DMF) more than ... % | Color shade |
|---|---|---|---|---|---|---|---|---|---|
| 87 | 0.09 | 0.05 | <0.01 | 8 | 1 | 462 | 13.2 | 10 | orange |
| 88 | 0.08 | 0.08 | <0.01 | 10 | 1 | 549 | 15.7 | 5 | pink |
| 89 | 0.50 | 0.36 | 0.10 | 20 | 1–2 | 396 | 11.3 | 5 | golden-yellow |
| 90 | 0.66 | 0.42 | 0.38 | 20 | 1–2 | 381 | 7.8 | 5 | yellow |
| 91 | 0.40 | 0.32 | 0.07 | 18 | 1–2 | 389 | 4.5 | 10 | yellow |
| 92 | 0.20 | 0.12 | 0.02 | 12 | 1 | 461 | 13.2 | 10 | yellow |
| 93 | 0.08 | 0.04 | 0.01 | 8 | 1 | 503 | 14.4 | 10 | golden-yellow |
| 94 | 0.09 | 0.02 | <0.01 | 4 | 2 | 476 | 6.7 | 10 | orange |
| 95 | 0.04 | 0.01 | <0.01 | 1 | 2 | 580 | 3.3 | 5 | red |
| 96 | 0.10 | 0.02 | 0.01 | 3 | 2 | 490 | 4.2 | 10 | golden-yellow |

EXAMPLE 97

0.5 part of the red, dope-soluble dyestuff described in Example 4 and also 0.5 part of the greenish-tinged yellow, dope-soluble dyestuff of the formula

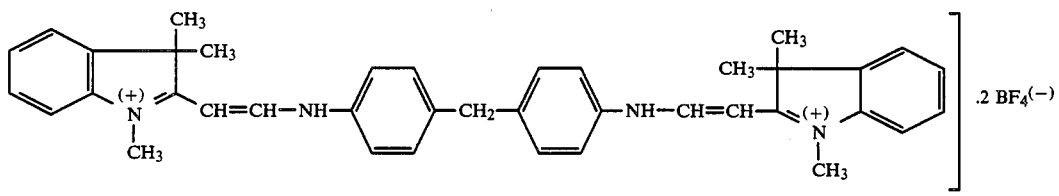

(having a M-factor of 1, a K-value of 2, a cation-weight of 566, the ratio R of cation weight/anion weight of 3.3, and a solubility S in dimethylformamide of more than 10%) are stirred into 400 parts of a 25% solution in dimethylacetamide of a polymer consisting of 94% of acrylonitrile, 5% of acrylic acid methyl ester and 1% of sodium methallylsulfonate, a scarlet-red, clear spinning solution being formed. This solution is warmed to 60° C. and is spun by the wet spinning process into a coagulation bath at 60° C., consisting of 50% by volume of dimethylacetamide and 50% by volume of water.

The filaments obtained are then stretched in a stretching bath at 80° C., consisting of 25% by volume of dimethylacetamide and 75% by volume of water and are washed in a purely aqueous washing bath at 95° C. Scarlet-red filaments with a very high luster are obtained. The bleeding into the coagulation, stretching and washing baths is very slight.

The bleeding values for the individual baths, for the two dyestuffs, are as follows:
Red dyestuff:
 $B_C$=0.03%
 $B_S$=0.01%
 $B_W$=less than 0.01%;
yellow dyestuff:
 $B_C$=0.01%
 $B_S$=less than 0.01%
 $B_W$=less than 0.01%.

EXAMPLE 98

0.8 part of the dope-soluble, yellow dyestuff mentioned in Example 18 and 0.2 part of the dope-soluble, blue-violet dyestuff mentioned in Example 1 are stirred into 400 parts of a 28% strength solution in dimethylformamide of a polymer consisting of 94% of acrylonitrile, 5.5% of acrylic acid methyl ester and 0.5% of sodium methallylsulfonate. The homogeneous green spinning solution formed is spun, stretched and washed in accordance with the procedure of Example 1. Deeply colored green filaments with a very high luster are obtained. The staining into the baths is extremely slight; the bleeding values in the individual baths, for the two dyestuffs, are as follows:
Blue-violet dyestuff:
 $B_C$=0.07%
 $B_S$=0.04%
 $B_W$=less than 0.01%;
yellow dyestuff:
 $B_C$=0.02%
 $B_S$=less than 0.01%
 $B_W$=less than 0.01%.

EXAMPLE 99

The process is carried out in accordance with the instructions of Example 98, but additionally 0.8 part of the dope-soluble, red dyestuff indicated in Example 45 is also added to the spinning solution; deeply colored brown filaments with a very high luster are obtained and the baths are only very slightly stained. The values are as follows:
Blue-violet dyestuff:
 $B_C$=0.01%
 $B_S$=0.01%
 $B_W$=less than 0.01%;
yellow dyestuff:
 $B_C$=0.07%,
 $B_S$=0.03%
 $B_W$=less than 0.01%;
red dyestuff:
 $B_C$=0.05%
 $B_S$=0.02%
 $BW$=0.01%.

EXAMPLES 100 TO 115

Spun-dyed filaments with outstanding properties are also obtained if the procedure followed is as described in Example 1, but using one of the dope-soluble dyestuffs described in the following text instead of the dope-soluble dyestuff employed in that Example.

The color shades of the filaments obtained and the indices and other values of the dyestuffs used in Examples 100 to 115 are to be found, listed in tabular form, subsequent to the dyestuff formulae.

| Example | Dyestuff |
|---|---|
| 100 | 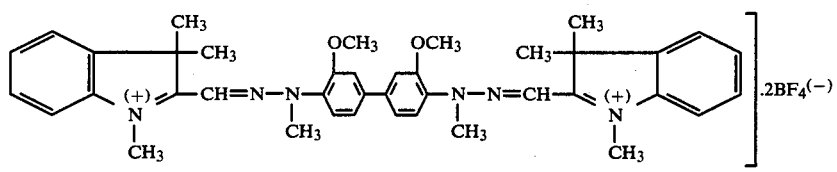 |
| 101 | 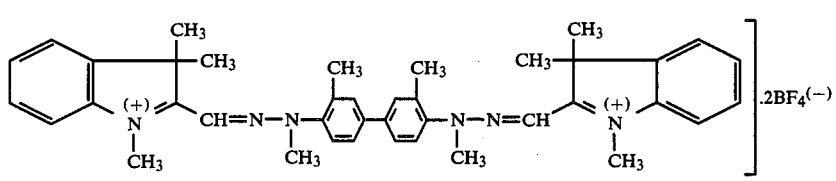 |
| 102 | 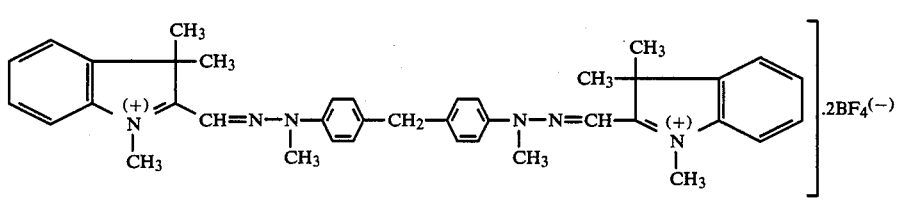 |
| 103 | 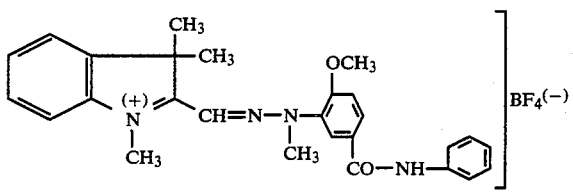 |
| 104 | 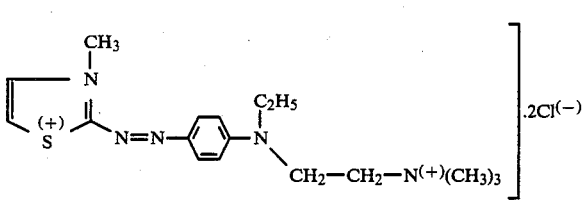 |
| 105 | 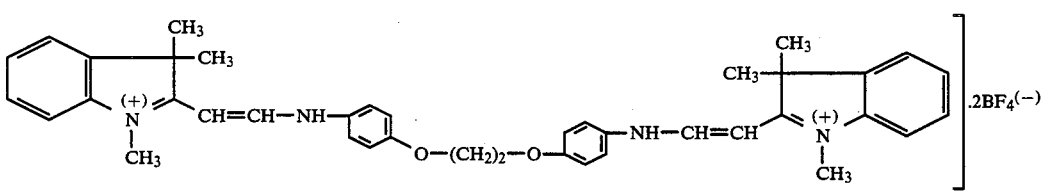 |
| 106 | 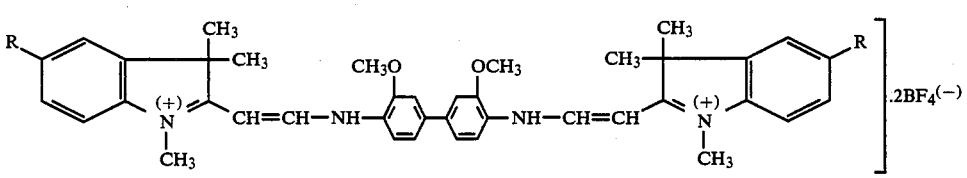 |
| | wherein R denotes a hydrogen atom; |
| 107 | as the formula of Example 106 wherein R denotes a chlorine atom; |
| 108 | as the formula of Example 106 wherein R denotes a methyl group; |
| 109 | as the formula of Example 106 wherein R denotes a methoxy group. |

| Example | Dyestuff |
|---|---|
| 110 | 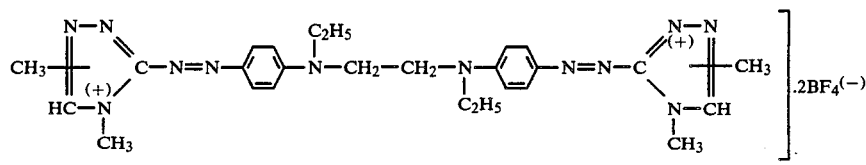 |
| 111 | 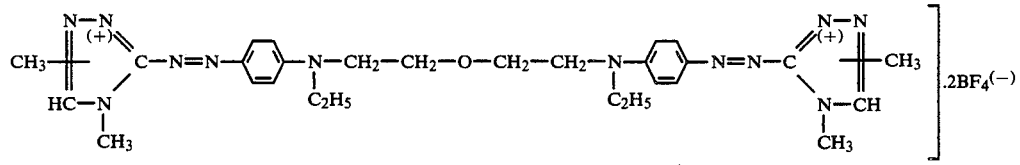 |
| 112 | 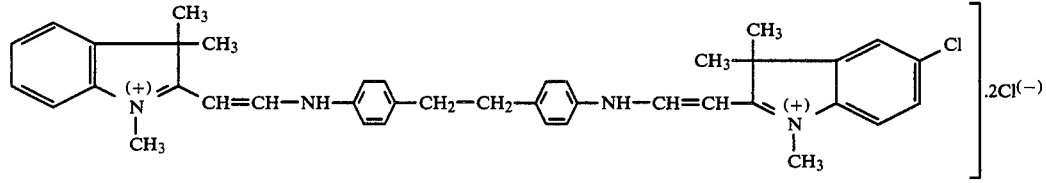 |
| 113 | 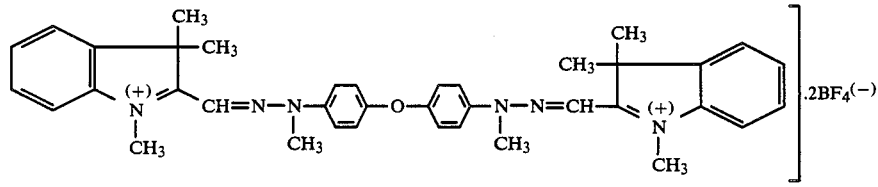 |
| 114 | 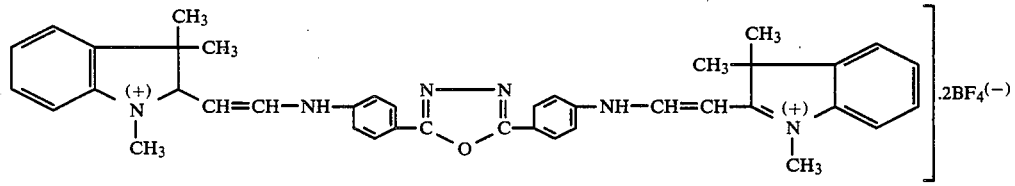 |

| Example | $B_C$ (%) | $B_S$ (%) | $B_W$ (%) | M | K | CW | R | S (in DMF) more than % | Color shade |
|---|---|---|---|---|---|---|---|---|---|
| 100 | 0.07 | 0.01 | <0.01 | 2 | 2 | 642 | 3.7 | 10 | golden-yellow |
| 101 | 0.08 | 0.04 | 0.01 | 2 | 1 | 610 | 3.5 | 10 | orange |
| 102 | 0.03 | 0.04 | 0.01 | 2 | 1 | 594 | 3.4 | 10 | golden-yellow |
| 103 | 0.35 | 0.20 | 0.12 | 15 | 2 | 441 | 5.1 | 5 | golden-yellow |
| 104 | 0.12 | 0.04 | 0.02 | 9 | 1 | 333 | 4.7 | 10 | blue |
| 105 | 0.04 | 0.03 | <0.01 | 5 | 1–2 | 612 | 3.7 | 10 | yellow |
| 106 | 0.014 | 0.01 | 0.022 | 1 | 1.5 | 634 | 4.2 | 12 | golden-yellow |
| 107 | 0.01 | 0.01 | 0.020 | 1 | 1 | 703 | 4.6 | 13 | golden-yellow |
| 108 | 0.01 | 0.01 | 0.020 | 1 | 1 | 662 | 4.35 | 14 | golden-yellow |
| 109 | 0.019 | 0.009 | 0.019 | 1 | 1.5 | 694 | 5.55 | 12 | golden-yellow |
| 110 | 0.045 | 0.01 | 0.055 | 2 | 2 | 516 | 3 | 5 | claret |
| 111 | 0.045 | 0.01 | 0.05 | 2 | 2 | 560 | 3.2 | 10 | red |
| 112 | 0.06 | 0.04 | 0.01 | 2 | 2 | 649 | 9.1 | 10 | brilliant yellow |
| 113 | 0.05 | 0.02 | 0.01 | 9 | 1 | 333 | 4.7 | 10 | blue |
| 114 | 0.09 | 0.05 | 0.02 | 4 | 1–2 | 620 | 3.7 | 10 | greenish-tinged yellow |

COMPARISON EXAMPLE 1

0.5 part of the dope-soluble, yellow dyestuff described in Example 2 and 0.5 part of the green, dope-soluble dyestuff of the formula

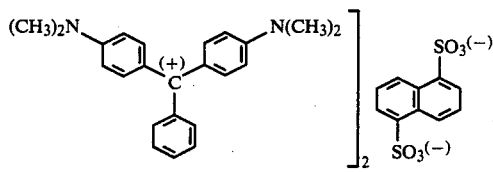

which is known from German Patent Specification 1,077,372, are stirred into 400 parts of a 28% strength solution in dimethylformamide of a polymer consisting of 90% of acrylonitrile, 9% of acrylic acid methyl ester, and 1% of sodium vinylsulfonate. This gives a homogeneous green spinning solution which is spun in accordance with the instructions in Example 1. Green filaments with a high luster are obtained, which, at the beginning of the spinning process, exhibit a yellowish-tinged green shade which changes into a bluish-tinged green shade at the end of the spinning process as a result of the poor fixability of the green triphenyl-methane dyestuff, which has characteristic indices being outside the scope according to the invention, and which bleeds considerably into the coagulation, stretching and washing baths.

The indices and properties for these two dyestuffs in the present spinning process are as follows:
Yellow dyestuff:
 $B_C = 0.08\%$
 $B_S = 0.02\%$
 $B_W = 0.01\%$
 $M = 1$, $K = 2$, $CW = 566$,
 $R = 3.3$, $S = $ more than 10%;
green dyestuff:
 $B_C = 6.2\%$
 $B_S = 3.4\%$
 $B_W = 1.9\%$
 $M = 45$, $K = 3$, $CW = 329$,
 $R = 2.3$, $S = $ more than 10%.

This example demonstrates that the new, technically advanced spinning process can only be carried advantageously if specific dyestuffs which meet specific criteria according to the present invention are selected and used so that the spinning process only leads to satisfactory results if attention is paid to the critical characteristics, according to the invention, for the dyestuffs used in the spinning process.

The same point will be dmonstrated in the following Comparison Examples 2.

COMPARISON EXAMPLE 2

0.2 part of the orange-colored, dope-soluble dyestuff described in Example 94 and 0.5 part of the violet dyestuff of the formula

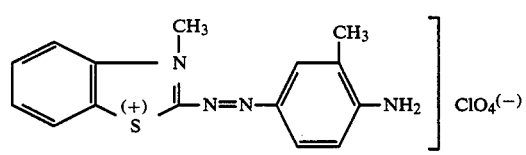

which is also dope-soluble and is known from German Patent Specification 1,197,191, are stirred into 400 parts of a 25% strength solution in dimethylformamide of a polymer consisting of 99% of acrylonitrile and 1% of sodium styrene-4-sulfonate. Stirring for a brief period gives a homogeneous red spinning solution which is spun in accordance with the instructions of Example 1. Red filaments with a high luster can be prepared in this manner, but, as the spinning process proceeds and as the processing baths become saturated with the bleeding violet dyestuff, the filaments change from an initial yellowish-tinged red shade into a bluish-tinged red shade. Filaments with a constant shade cannot be obtained in this manner.

The two dyestuffs have the following indices and staining properties in the presence spinning process:
Orange-colored dyestuff:
 $B_C = 0.10\%$
 $B_S = 0.02\%$
 $B_W = $ less than 0.01%
 $M = 4$, $K = 2$, $CW = 476$,
 $R = 6.7$, $S = $ more than 10%;
violet dyestuff:
 $B_C = 4.4\%$
 $B_S = 3.4\%$
 $B_W = 1.5\%$
 $M = 52$, $K = 4$, $CW = 284$,
 $R = 2.9$, $S = $ more than 10%.

We claim:

1. In a process for spin-dyeing an acid-modified polymer or copolymer of acrylonitrile with a cationic dyestuff according to the wet-spinning procedure, the improvement consisting essentially of employing, as the cationic dyestuff, a quaternary dyestuff which contains in the cation two or three cationic quaternary groups selected from ammonium, lower dialkyl hydrazonium and cyclammonium groups, and which has a migration factor M of 20 or less, a combination index K of less than 2.5 and a cation weight CW of more than 310.

2. A process according to claim 1 wherein the quaternary dyestuff has a migration factor M of equal to or less than 10, a K-value of less than 2 and a CW-value of greater than 380.

3. A process according to claim 1 wherein the ratio of cation weight to anion weight of the quaternary dyestuff is greater than 2.5.

4. A process according to claim 1, wherein the quanternary dyestuff is a dyestuff of the formula

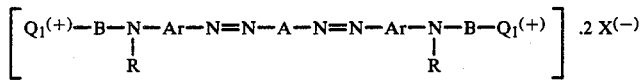

in which
 A is the radical of an aromatic carbocyclic or aromatic heterocyclic tetrazo component,
 Ar, being identical to or different from one another, each is p-phenylene' or 1,4-naphthylene unsubstituted or substituted by one or two substituents selected from the group consisting of lower alkyl, lower alkoxy, halogen, nitro, lower alkanoylamino and trifluoromethyl,
 R, being identical to or different from one another, each is hydrogen or lower alkyl unsubstituted or substituted, or an aralkyl or a cycloalkyl,
 B, being identical to or different from one another, each is a divalent aliphatic bridge member, $Q_1^{(+)}$, being identical to or different from one another, each is a quaternary ammonium group, a 18wer dialkylhydrazonium group or a cyclammonium radical and $X^{(-)}$ is the equivalent of an anion.

5. A process according to claim 1 wherein the quaternary dyestuff is a dyestuff of the formula

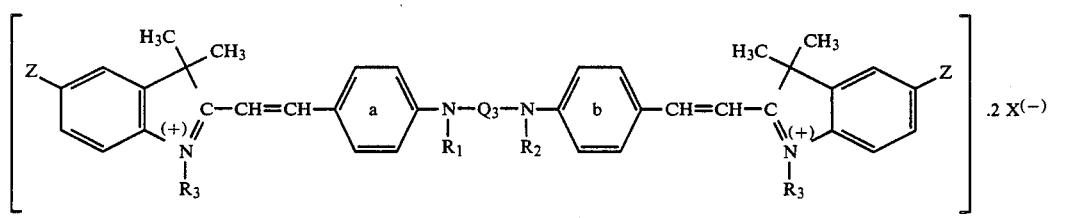

in which

R₃ is lower alkyl unsubstituted or substituted by one or two substituents selected from the group consisting of hydroxy, acetoxy, lower alkoxy, cyano, lower carbalkoxy, chlorine, phenyl, carbamoyl, carbamoyl mono-substituted or di-substituted by lower alkyl, phenyl or benzyl, and phenyl substituted by substituents selected from the group consisting of halogen, lower alkyl, lower alkoxy, nitro, acetylamino, sulfamoyl and carbamoyl, or is phenylalkyl the phenyl being unsubstituted or substituted by one or two substituents selected from the group consisting of lower alkyl, lower alkoxy and chlorine, Z, being identical to or different from one another, each is hydrogen, halogen, lower alkyl, lower alkoxy, nitro, an aryloxy, an aralkoxy or lower carbalkoxy, Q₃ is lower alkylene which is optionally interrupted by —O—, —NH— or an aromatic carbocyclic radical, R₁ and R₂, being identical to or different from one another, each is hydrogen or lower alkyl unsubstituted or substituted, or R₁ and R₂ conjointly with the two nitrogen atoms and the radical Q₃ form a heterocyclic ring, the benzene nuclei a and b each are unsubstituted or substituted in an identical or different manner, the substituents being 1 or 2 substituents selected from the group consisting of lower alkyl, lower alkoxy, halogen, trifluoromethyl and lower alkanoylamino, or the benzene nuclei a or b or both contain a fused benzene ring thus forming a naphthylene, and $X^{(-)}$ is the equivalent of an anion.

6. A process according to claim 1, wherein the quaternary dyestuff is a dyestuff of the formula

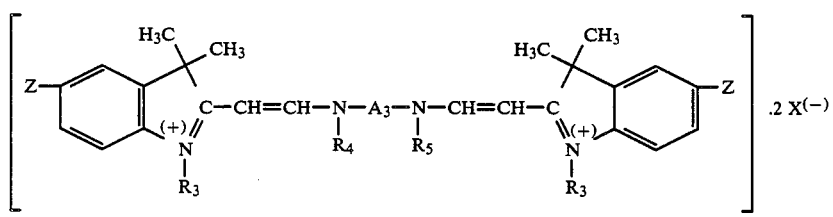

in which

A₃ is the divalent radical of benzene, diphenyl, glycol diphenyl ether, diglycol diphenyl ether, of a lower diphenylalkane, diphenyl ether, diphenyl sulfide, diphenyl sulfone, azobenzene or diphenylurea, the benzene nuclei of which may additionally be substituted by one or two substituents selected from the group consisting of lower alkyl, lower alkoxy, halogen, carbamoyl and sulfamoyl, or A₃ is the divalent radical of 2-phenyl-benzimidazole, 2-phenyl-benzthiazole, 2-phenyl-benzoxazole or diphenyloxadiazole, the heterocyclic ring of which may additionally be substituted by lower alkyl, or A₃ is the divalent group of the formula

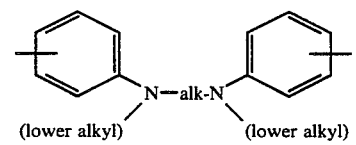

in which alk is lower alkylene,

R₄ and R₅, being identical to or different from one another, each is hydrogen or lower alkyl unsubstituted or substituted by one or two substituents selected from the group consisting of hydroxy, acetoxy, lower alkoxy, cyano, lower carbalkoxy, chlorine, phenyl, carbamoyl, carbamoyl mono-substituted or di-substituted by lower alkyl, phenyl or benzyl, and phenyl substituted by substituents selected from the group consisting of halogen, lower alkyl, lower alkoxy, nitro, acetylamino, sulfamoyl and carbamoyl, R₃ is lower alkyl unsubstituted or substituted by one or two substituents selected from the group consisting of hydroxy, acetoxy, lower alkoxy, cyano, lower carbalkoxy, chlorine, phenyl, carbamoyl, carbamoyl mono-substituted or di-substituted by lower alkyl, phenyl or benzyl, and phenyl substituted by substituents selected from the group consisting of halogen, lower alkyl, lower alkoxy, nitro, acetylamino, sulfamoyl and carbamoyl mono-substituted or di-substituted by lower alkyl, or is phenylalkyl the phenyl being unsubstituted or substituted by one or two substituents selected from the group consisting of lower alkyl, lower alkoxy and chlorine, Z, being identical to or different from one another, each is hydrogen, halogen, lower alkyl, lower alkoxy, nitro, an aryloxy, an aralkoxy or lower carbalkoxy, and X$^{(-)}$ is the equivalent of an anion.

7. A process according to claim 1, wherein the quaternary dyestuff is a dyestuff of the formula

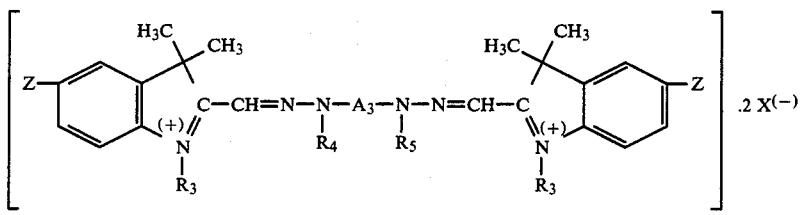

in which

A$_3$ is divalent radical of benzene, diphenyl, glycol diphenyl ether, diglycol diphenyl ether, of a lower diphenylalkane, diphenyl ether, diphenyl sulfide, diphenyl sulfone, azobenzene or diphenylurea, the benzene nuclei of which may additionally be substituted by one or two substituents selected from the group consisting of lower alkyl, lower alkoxy, halogen, carbamoyl and sulfamoyl, or A$_3$ is the divalent radical of 2-phenyl-benzimidazole, 2-phenyl-benzthiazole, 2-phenyl-benzoxazole or diphenyloxadiazole, the heterocyclic ring of which may additionally be substituted by lower alkyl, or A$_3$ is the divalent radical of the formula

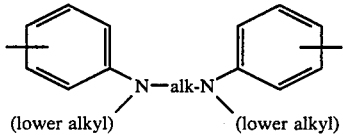

in which
alk is lower alkylene,

R$_4$ and R$_5$, being identical to or different from one another, each is hydrogen or lower alkyl unsubstituted or substituted by one or two substituents selected from the group consisting of hydroxy, acetoxy, lower alkoxy, cyano, lower carbalkoxy, chlorine, phenyl, carbamoyl, carbamoyl mono-substituted or di-substituted by lower alkyl, phenyl or benzyl, and phenyl substituted by substituents selected from the group consisting of halogen, lower alkyl, lower alkoxy, nitro, acetylamino, sulfamoyl and carbamoyl, R$_3$ is lower alkyl unsubstituted or substituted by one or two substituents selected from the group consisting of hydroxy, acetoxy, lower alkoxy, cyano, lower carbalkoxy, chlorine, phenyl, carbamoyl, carbamoyl mono-substituted or di-substituted by lower alkyl, phenyl or benzyl, and phenyl substituted by substituents selected from the group consisting of halogen, lower alkyl, lower alkoxy, nitro, acetylamino, sulfamoyl and carbamoyl, or is phenylalkyl the phenyl being unsubstituted or substituted by one or two substitutents selected from the group consisting of lower alkyl, lower alkoxy and chlorine, Z, being identical to or different from one another, each is hydrogen, halogen, lower alkyl, lower alkoxy, nitro, an aryloxy, an aralkoxy or lower carbalkoxy, and X$^{(-)}$ is the equivalent of an anion.

8. A process according to claim 1, wherein the quaternary dyestuff is a dyestuff of the formula $$[D^{(+)}-N=N-K]\cdot 2X^{(-)}$$

in which

D$^{(+)}$ is the radical of a quaternary, aromatic carbocyclic or heterocyclic diazo component which contains one of the quaternary groups mentioned in claim 1, K is the radical of a coupling component selected from the coupling components of the benzene, aminonaphthalene, naphthol and indole series, which is substituted via a bridge member by one of the quaternary groups mentioned in claim 1, and X$^{(-)}$ is the equivalent of an anion.

9. A process according to claim 6, wherein the quaternary dyestuff of the formula

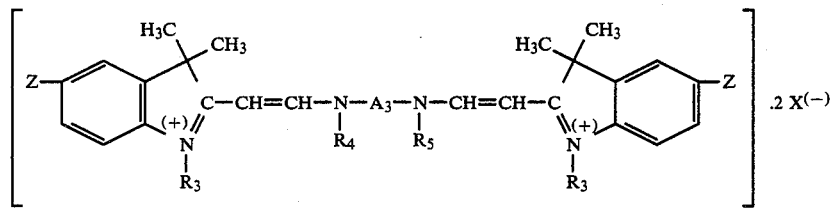

is defined as follows:

A$_3$ is the divalent radical of benzene, of diphenyl, of glycol diphenyl ether, of diglycol diphenyl ether, of a lower diphenylalkane, of diphenyl ether or of azobenzene, the benzene nuclei of which are unsubstituted or substituted by one or two substituents selected from the group consisting of lower alkyl, lower alkoxy and halogen, or A$_3$ is the divalent group of the formula

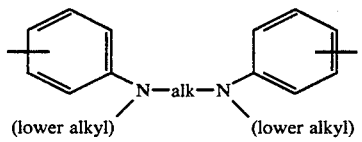

(lower alkyl)   (lower alkyl)

in which alk is lower alkylene,

R$_3$ is lower alkyl unsubstituted or substituted by hydroxy, acetoxy, lower alkoxy, cyano, lower carbalkoxy, chlorine, phenyl or carbamoyl, R$_4$ and R$_5$, being identical to or different from one another, each is hydrogen or lower alkyl unsubstituted or substituted by hydroxy, acetoxy, lower alkoxy, cyano, lower carbalkoxy, chlorine, phenyl or carbamoyl, Z, being identical to or different from one another, each is hydrogen, lower alkyl, lower alkoxy, nitro or lower carbalkoxy, X$^{(-)}$ is the equivalent of an anion.

10. A process according to claim 7, wherein the quaternary dyestuff of the formula

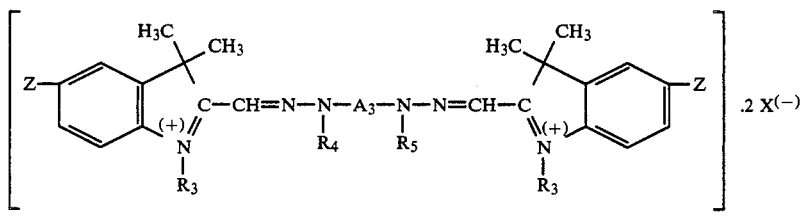

is defined as follows:

A$_3$ is the divalent radical of benzene, of diphenyl, of diphenyl ether, of glycol diphenyl ether, of diglycol diphenyl ether or of a lower diphenylalkane, the benzene nuclei of which are unsubstituted or substituted by one or two substituents selected from the group consisting of lower alkyl, lower alkoxy and halogen, or A$_3$ is the divalent group of the formula

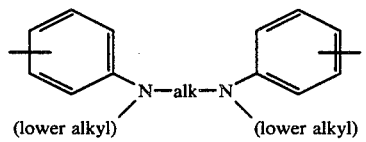

(lower alkyl)   (lower alkyl)

in which alk is lower alkylene,

R$_3$ is lower alkyl unsubstituted or substituted by hydroxy, acetoxy, lower alkoxy, cyano, lower carbalkoxy, chlorine, phenyl or carbamoyl, R$_4$ and R$_5$, being identical to or different from one another, each is hydrogen or lower alkyl unsubstituted or substituted by hydroxy, acetoxy, lower alkoxy, cyano, lower carbalkoxy, chlorine, phenyl or carbamoyl, Z, being identical to or different from one another, each is hydrogen, lower alkyl, lower alkoxy, nitro or lower carbalkoxy, X$^{(-)}$ is the equivalent of an anion.

11. A process according to claim 9, wherein the quaternary dyestuff employed is a dyestuff of the formula

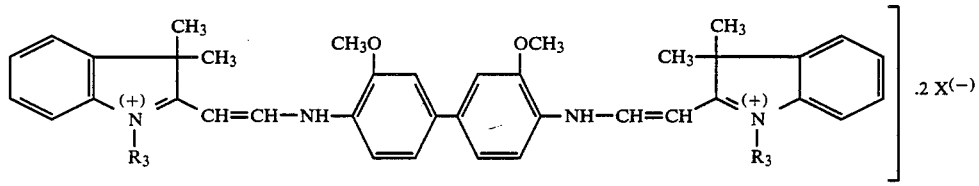

in which X$^{(-)}$ is the equivalent of an anion and R$_3$ is lower alkyl.

12. A process according to claim 11 in which X(−) is the tetrafluoroborate anion.

13. A process according to claim 1, wherein two or more of said quaternary dyestuffs are employed.

14. A process according to claim 1, wherein the quaternary dyestuff has a migration factor M of 10 or less than 10, a K-value of less than 2 and a CW-value of greater than 480.

15. A process according to claim 3, wherein the quaternary dyestuff has a migration factor M of 10 or less than 10, a K-value of less than 2 and a CW-value of greater than 480.

16. A fiber or a fiber material made of an acid-modified polymer of copolymer of acrylonitrile, which had been colored by wet spin-dyeing with a quaternary dyestuff, said dyestuff containing, in the cation, two or three quaternary groups selected from ammonium, lower dialkylhydrazonium and cyclammonium groups, and having a migration factor M of 20 or less, a combination index K of less than 2.5 and a cation weight CW of more than 310.

* * * * *

UNITED STATES PATENT AND TRADEMARK OFFICE
CERTIFICATE OF CORRECTION

PATENT NO. : 4,607,071
DATED : August 19, 1986
INVENTOR(S) : MANFRED HAHNKE ET AL It is certified that error appears in the above-identified patent and that said Letters Patent is hereby corrected as shown below:

In claim 4, column 58, lines 45 and 46, for "quanternary"

read -- quaternary --.

In claim 4, column 59, line 3, for "18wer" read -- lower --.

Signed and Sealed this

Eighth Day of September, 1987

Attest:

DONALD J. QUIGG

*Attesting Officer*  *Commissioner of Patents and Trademarks*